US012747394B2

(12) United States Patent
Hodgkinson et al.

(10) Patent No.: US 12,747,394 B2
(45) Date of Patent: Sep. 29, 2026

(54) DISPERSIONS

(71) Applicant: LANKEM LTD., Dukinfield (GB)

(72) Inventors: Sean Graham Hodgkinson, Dukinfield (GB); John Adamson, Dukinfield (GB)

(73) Assignee: LANKEM LTD., Dukinfield (GB)

( * ) Notice: Subject to any disclaimer, the term of this patent is extended or adjusted under 35 U.S.C. 154(b) by 808 days.

(21) Appl. No.: 17/800,142

(22) PCT Filed: Feb. 17, 2021

(86) PCT No.: PCT/GB2021/050388

§ 371 (c)(1),
(2) Date: Aug. 16, 2022

(87) PCT Pub. No.: WO2021/165671

PCT Pub. Date: Aug. 26, 2021

(65) Prior Publication Data

US 2023/0097727 A1 Mar. 30, 2023

(30) Foreign Application Priority Data

Feb. 18, 2020 (GB) ...................................... 2002226

(51) Int. Cl.
*C09K 23/00* (2022.01)
*C08K 5/1515* (2006.01)
(Continued)

(52) U.S. Cl.
CPC .......... *C09K 23/017* (2022.01); *C08K 5/1515* (2013.01); *C09D 11/326* (2013.01);
(Continued)

(58) Field of Classification Search
CPC ...... C09K 23/017; C09K 23/34; C09K 23/16; C08K 5/1515; C09D 11/326; C09D 17/003; C09D 17/004
See application file for complete search history.

(56) References Cited

U.S. PATENT DOCUMENTS 2,184,952 A 12/1939 Zimmer et al.
2,819,278 A 1/1958 De et al.
(Continued)

FOREIGN PATENT DOCUMENTS

DE 3432219 A1 3/1986
EP 2631289 A1 8/2013
(Continued)

OTHER PUBLICATIONS

Biswas, et al., "Synthesis of Diethylamine-Functionalised Soybean Oil, Suitable for Use as a Surfactant", Journal of Agricultural and Food Chemistry, vol. 53, 2005, 9485-9490.
(Continued)

*Primary Examiner* — Jiangtian Xu
(74) *Attorney, Agent, or Firm* — F. Brent Nix, Esq.; Johnson, Marcou, Isaacs & Nix, LLC

(57) ABSTRACT

A dispersion comprising a solid particulate component such as a pigment, a dispersing agent and one or more solvents is disclosed. The dispersing agent comprises a reaction product of (a) an epoxidised carboxylic acid ester; (b) a compound including at least one reactive alcohol and/or amino functional group; and (c) a derivatising agent. Such a dispersion shows excellent long-term stability. A method of producing such a dispersion having long-term stability, and a use of the dispersing agent to provide a dispersion having long-term stability are also described.

18 Claims, 10 Drawing Sheets

(51) Int. Cl.

| | |
|---|---|
| ***C09D 11/326*** | (2014.01) |
| ***C09D 17/00*** | (2006.01) |
| ***C09K 23/16*** | (2022.01) |
| ***C09K 23/34*** | (2022.01) |

(52) U.S. Cl.

CPC ......... *C09D 17/003* (2013.01); *C09D 17/004* (2013.01); *C09K 23/16* (2022.01); *C09K 23/34* (2022.01)

(56) References Cited

U.S. PATENT DOCUMENTS

| | | | | |
|---|---|---|---|---|
| 3,066,159 | A | 11/1962 | De et al. | |
| 3,281,438 | A | 10/1966 | Liddell | |
| 3,769,182 | A | 10/1973 | Beckwith et al. | |
| 4,597,799 | A | 7/1986 | Schilling | |
| 4,656,061 | A | 4/1987 | Didomenico | |
| 4,923,642 | A | 5/1990 | Rutzen et al. | |
| 4,975,090 | A | 12/1990 | Brehm et al. | |
| 4,978,395 | A | 12/1990 | Canestri | |
| 5,284,496 | A | 2/1994 | Baillargeon et al. | |
| 5,403,440 | A | 4/1995 | Daute et al. | |
| 6,320,064 | B1 | 11/2001 | Oftring et al. | |
| 9,085,709 | B1 | 7/2015 | Lele | |
| 11,692,096 | B2 | 7/2023 | Adamson et al. | |
| 2010/0292492 | A1 | 11/2010 | Geng et al. | |
| 2010/0324185 | A1 | 12/2010 | Geng et al. | |
| 2012/0034178 | A1* | 2/2012 | Bujard | C01B 21/076 524/413 |
| 2013/0165555 | A1* | 6/2013 | Sawa | C09D 5/024 524/43 |
| 2013/0225859 | A1 | 8/2013 | Allen et al. | |
| 2016/0310401 | A1* | 10/2016 | Greyson | A61K 8/463 |
| 2017/0044090 | A1 | 2/2017 | Benecke et al. | |
| 2019/0177655 | A1* | 6/2019 | Garbark | C11D 1/42 |
| 2021/0347983 | A1* | 11/2021 | Adamson | C08G 59/1477 |

FOREIGN PATENT DOCUMENTS

| | | | | |
|---|---|---|---|---|
| GB | 1037021 | A | 7/1966 | |
| GB | 2562172 | A | 11/2018 | |
| GB | 2576415 | A | 2/2020 | |
| SU | 1608379 | A1 | 11/1990 | |
| WO | 9106531 | A1 | 5/1991 | |
| WO | WO-2018203035 | A1 * | 11/2018 | C08G 73/0206 |
| WO | 2019118456 | A1 | 6/2019 | |
| WO | 2020/058664 | A1 | 3/2020 | |

OTHER PUBLICATIONS

Doll, et al., "Synthesis and Performance of Surfactants Based on Epoxidized Methyl Oleate and Glycerol", Journal of Surfactants and Detergents, Heidelberg, vol. 9, No. 4, Fourth Quarter, 2006, 377-383.

Shikhaliev, et al., "Epoxidized Methyl Esters and Triglycerides of Vegetable Oil Unsaturated Fatty Acids Etc.", Preprints, Dec. 25, 2017, 1-20.

* cited by examiner

DISPERSIONS

CROSS-REFERENCE TO RELATED APPLICATIONS

This application is the 35 U.S.C. § 371 national stage application of PCT Application No. PCT/GB2021/050388, filed Feb. 17, 2021, where the PCT claims priority to, and the benefit of, United Kingdom application entitled “Improvements relating to dispersions” having serial no. 2002226.5, filed Feb. 18, 2020, both of which are herein incorporated by reference in their entireties.

FIELD

The present invention relates to dispersing agents and compositions, methods and uses relating thereto. In particular the invention relates to dispersing agents with an improved environmental profile.

BACKGROUND

Pigments and other solid components such as inorganic fillers, pearlescent agents, brighteners and dyes are commonly suspended in liquids in high concentrations (which may be termed a concentrate) for dosing into paints, polymers, coatings, inks and other compositions in order to impart colour, opacity, matting, gloss and/or other optical properties.

Dispersing agents are used to ensure that these solid components are evenly distributed throughout the concentrate liquid and do not precipitate, aggregate or flocculate during storage or use of the liquid. When such a concentrate is dosed into another liquid, for example to form a paint, polymer or ink, the dispersing agents also facilitate mixing of the pigment or other agent throughout the paint, coating, polymer or ink and help to form and maintain a stable suspension.

Such solid pigments are used to provide colour to paints, polymers, coatings and inks. Concentrated liquid dispersions of such pigments are often easier to dose and handle than powdered compounds. The role of dispersing agents is therefore very important in the manufacture of concentrates and subsequently paints, polymers, coatings and inks.

Many different dispersing agents are known. The choice of dispersing agent depends on the pigment to be dispersed and the nature of the medium into which it is dispersed.

However, many existing dispersing agents with acceptable dispersing properties are derived from non-renewable sources such as fossil fuels and may be inherently toxic and/or harmful to the environment. This may cause problems downstream for users of the concentrates or paints, polymers, coatings and inks comprising the dispersing agents and in particular in the safe disposal of such liquids comprising the dispersing agents. There is therefore a need to develop dispersing agents which have an improved environmental profile compared to known dispersants, for example it would beneficial if a dispersing can be obtained from renewable sources and/or a dispersing agent which is biodegradable.

SUMMARY OF THE INVENTION

According to a first aspect of the present invention there is provided a liquid dispersion comprising:

a solid particulate component;

a dispersing agent; and one or more solvents;

wherein the dispersing agent comprises a reaction product of:

(a) an epoxidised carboxylic acid ester;

(b) a compound including at least one reactive alcohol and/or amino functional group; and (c) a derivatising agent.

The solid particulate component is suitably dispersed in the liquid dispersion by the dispersing agent. The dispersing agent suitably provides a stable liquid dispersion of the solid particulate component, preventing the solid particulate component from agglomerating or precipitating from the liquid dispersion. Suitably the liquid dispersion is stable over a relatively long period of time.

The solid particulate component is suitably a particulate solid that is intended to be included in liquid paints, polymers, coatings and inks, for example a particulate solid which provides an optical property to such liquids, for example colour, opacity, matting, gloss, pearlescence, brightness etc. Such compounds may be referred to as “optical modifiers”. For example, the solid particulate component may be a pigment, a filler, a pearlescent agent, a brightener or a dye.

The liquid dispersion is suitably a liquid concentrate used to provide such an optical modifier to a paint, polymer, coating or ink.

The dispersion of the present invention has been found to provide a similar or higher level of performance in dispersing and stabilising in a liquid such solid particulate components compared to conventional dispersions. In particular the liquid dispersion of this first aspect shows excellent stability including stable viscosity over long storage periods. Advantageously this means that the dispersions do not need to be prepared at or near the time of use. The dispersing agent of the liquid dispersion of this first aspect being formed by the reaction of (a), (b) and (c) allows the dispersing agent to be formed from renewable sources and to be biodegradable and non-toxic. This improves the environmental and safety profile of the liquid dispersion compared to similar liquid dispersions formed using known dispersing agents. To date it has been difficult to replace the currently used dispersants formed from non-renewable chemical feedstocks with safer and more environmentally benign alternatives whilst maintaining the dispersing and stabilising properties of the dispersing agent. The inventors have surprisingly found that the dispersing agents derived from components (a), (b) and (c) achieve, and in some cases exceed, this required level of performance in the liquid dispersions of this first aspect.

The Solid Particulate Component

The solid particulate component is suitably an optical modifier. Suitably, the solid particulate component comprises a pigment, a filler, a pearlescent agent, a brightener or a dye.

The amount of solid particulate component present in the dispersion will depend on the nature of the solid particulate component and the intended use of the dispersion. The solid particulate component may be present in the dispersion in an amount of at least 20 wt %, suitably at least 30 wt %, suitably at least 50 wt %, suitably at least 60 wt %, for example at least 70 wt % based on the total weight of solids in the dispersion. In some embodiments the solid particulate component is present in an amount of from 50 to 95 wt %, suitably from 60 to 95 wt %, for example from 70 to 90 wt % based on the total weight of solids in the dispersion.

The solid particulate component may be present in the liquid dispersion in an amount of at least 10 wt %, suitably at least 20 wt %, suitably at least 30 wt %, suitably at least 40 wt % of the total weight of the liquid dispersion. The solid particulate component may be present in the liquid dispersion in an amount of up to 80 wt %, suitably up to 70 wt %, suitably up to 60 wt % of the total weight of the liquid dispersion.

The solid particulate component may suitably have a particle size of from 0.001 to 50 microns, suitably from 0.05 to 20 microns, for example from 0.01 to 5 microns. However, the skilled person will appreciate that the particle size may vary depending on the application in which the composition will be used.

In some embodiments, the solid particulate component is a pigment. Any suitable pigment may be included. Suitable pigments for use herein include inorganic and organic pigments.

Suitable classes of organic pigments for use herein include alizarin, azo-pigments (for example yellow, orange and red colour range), phthalocyanine (for example blue and green colour range) and quinacridone (for example red-violet). Examples of suitable organic pigments for use herein include pigment blue 15:6; pigment red 57.1, pigment red 48:1 and pigment red 48:3; pigment yellow 14, pigment yellow 17, pigment yellow 83 and pigment yellow 74; pigment green 7; pigment violet 23; and pigment orange 13 and pigment orange 34.

Suitable inorganic pigments for use herein include titanium dioxide, graphene, carbon black (for example carbon black 7 and carbon black 430), iron oxide, chromium pigments and ultramarine blue.

In some embodiments, the solid particulate component is an inorganic filler. Suitable inorganic fillers for use herein include calcium carbonate, barium sulphate, kaolin, diatomaceous earth and sulfur.

The Dispersing Agent

The liquid dispersion of this first aspect comprises a dispersing agent comprising a reaction product of:

(a) an epoxidised carboxylic acid ester;

(b) a compound including at least one reactive alcohol and/or amino functional group; and (c) a derivatising agent.

Suitably the dispersing agent is prepared by (i) reacting (a) an epoxidised carboxylic acid ester with (b) a compound including at least one reactive alcohol and/or amino functional group; and (ii) reacting the reaction product of step (i) with (c) a derivatising agent.

Thus the dispersing agent suitably comprises a reaction product of (c) a derivatising agent with a reaction product of (a) an epoxidised carboxylic acid ester and (b) a compound including at least one reactive alcohol and/or amino functional group.

Suitably the dispersing agent is the direct product of the reaction of (a), (b) and (c) and is used in the liquid dispersion without significant work-up or purification of the reaction mixture, aside from optionally neutralising any acid used in the reaction and/or evaporating volatile components of the reaction mixture. For example an alcohol such as methanol may be produced in the reaction as a result of transesterification of the carboxylic acid ester moiety of component (a) and this is suitably removed from the dispersing agent before incorporation into the liquid dispersion.

The epoxidised carboxylic acid ester (a) may comprise an ester of a monocarboxylic acid or a polycarboxylic acid, for example a dicarboxylic acid. In embodiments in which the epoxidised carboxylic acid ester (a) comprises an ester of a polycarboxylic acid, suitably each acid group is esterified.

Preferably the epoxidised carboxylic acid ester (a) comprises an ester of formula $RCOOR^1$ in which R is a hydrocarbyl group including an epoxy functional group and $R^1$ is a hydrocarbyl group.

R is suitably an alkyl, alkenyl or aralkyl group comprising at least one epoxy functional group and $R^1$ is suitably an alkyl or aryl group.

R comprises at least one epoxy functional group. It may comprise more than one epoxy functional group. R is suitably an alkyl, alkenyl or aralkyl group having one or more epoxy substituents, preferably one or two epoxy substituents. Preferably R is an epoxy substituted alkyl or alkenyl group.

In preferred embodiments, the or each epoxy functional group is a secondary epoxy group. By secondary epoxy group, we mean an epoxy group wherein both carbon atoms of the epoxide ring are bound to a further carbon atom, i.e. the epoxy moiety is preferably not at a terminal position.

Suitably the epoxidised carboxylic acid ester (a) comprises one to four, preferably one to three, more preferably one or two epoxy groups. In some preferred embodiments, the epoxidised carboxylic acid ester (a) contains one epoxy group. In some preferred embodiments, the epoxidised carboxylic acid ester (a) contains two epoxy groups.

In some embodiments R may include one or more further substituents in addition to the one or more epoxy substituents. In preferred embodiments the one or more epoxy groups are the only substituents of the alkyl, alkenyl or aralkyl group R.

In some embodiments R is an epoxy substituted alkenyl group. Suitably the alkenyl group may comprise one or more double bonds, for example one, two or three double bonds, suitably one or two double bonds.

Preferably R is an epoxy substituted alkyl group.

Preferably R is an aliphatic group, more preferably an unbranched aliphatic group.

Suitably R has at least 6 carbon atoms, preferably at least 8 carbon atoms, more preferably at least 10 carbon atoms. R may have up to 36 carbon atoms, suitably up to 30 carbon atoms, preferably up to 26 carbon atoms, for example up to 24 carbon atoms. In preferred embodiments R has from 6 to 26 carbon atoms, more preferably from 8 to 24 carbon atoms, most preferably from 10 to 22 carbon atoms or from 14 to 20 carbon atoms.

The epoxidised carboxylic acid ester (a) may comprise a mixture of compounds including mixtures of homologues in which the groups R have different numbers of carbon atoms. Natural sources of carboxylic acids typically contain mixtures of compounds.

R may be straight chain or branched. Preferably R is straight chain.

Preferably $R^1$ is an alkyl or aryl group. More preferably $R^1$ is an alkyl group.

Preferably $R^1$ is an unsubstituted alkyl group.

$R^1$ has at least 1 carbon atom. Suitably $R^1$ has up to 22 carbon atoms, preferably up to 20 carbon atoms, more preferably up to 18 carbon atoms. In preferred embodiments $R^1$ has from 1 to 18 carbon atoms, preferably from 1 to 12 carbon atoms, for example from 1 to 8 carbon atoms. $R^1$ may be straight chain or branched.

$R^1$ may be selected from methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 1,1-dimethylpropyl, 1,2-dimethylpropyl, 2,2-dimethylpropyl, 1-ethylpropyl, hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, 1-methylhexyl, 2-methylhexyl, 3-methylhexyl, 4-methylhexyl, 5-methylhexyl, 1,1-dimethylpentyl, 1,2-dimethylpentyl, 1,3-dimethylpentyl, 1,4-dimethylpentyl, 2,2-dimethylpentyl, 2,3-dimethylpentyl, 2,4-dimethylpentyl, 3,3-dimethylpentyl, 3,4-dimethylpentyl, 4,4-dimethylpentyl, 1-ethylpentyl, 2-ethylpentyl, 3-ethylpentyl, 1,1,2-trimethylbutyl, 1,1,3-trimethylbutyl, 1,2,2-trimethylbutyl, 1,2,3-trimethylbutyl, 1,3,3-trimethylbutyl, 2,2,3-trimethylbutyl, 2,3,3-trimethylbutyl, 1-ethyl-1-methylbutyl, 1-ethyl-2-methylbutyl, 1-ethyl-3-methylbutyl, 2-ethyl-1-methylbutyl, 2-ethyl-2-methylbutyl, 2-ethyl-3-methylbutyl, 1-propylbutyl, octyl, 1-methylheptyl, 2-methylheptyl, 3-methylheptyl, 4-methylheptyl, 5-methylheptyl, 6-methylheptyl, 1,1-dimethylhexyl, 1,2-dimethylhexyl, 1,3-dimethylhexyl, 1,4-dimethylhexyl, 1,5-dimethylhexyl, 2,2,-dimethylhexyl, 2,3-dimethylhexyl, 2,4-dimethylhexyl, 2,5-dimethylhexyl, 3,3-dimethylhexyl, 3,4-dimethylhexyl, 3,5-dimethylhexyl, 4,4-dimethylhexyl, 4,5-dimethylhexyl, 5,5-dimethylhexyl, 1-ethylhexyl, 2-ethylhexyl, 3-ethylhexyl, 4-ethylhexyl, 1,1,2-trimethylpentyl, 1,1,3-trimethylpentyl, 1,1,4-trimethylpentyl, 1,2,2-trimethylpentyl, 1,2,3-trimethylpentyl, 1,2,4-trimethylpentyl, 1,3,3-trimethylpentyl, 1,3,4-trimethylpentyl, 1,4,4-trimethylpentyl, 2,2,3-trimethylpentyl, 2,2,4-trimethylpentyl, 2,3,3-trimethylpentyl, 2,3,4-trimethylpentyl, 2,4,4-trimethylpentyl, 3,3,4-trimethylpentyl, 3,4,4-trimethylpentyl, 1-ethyl-1-methylpentyl, 1-ethyl-2-methylpentyl, 1-ethyl-3-methylpentyl, 1-ethyl-4-methylpentyl, 2-ethyl-1-methylpentyl, 2-ethyl-2-methylpentyl, 2-ethyl-3-methylpentyl, 2-ethyl-4-methylpentyl, 3-ethyl-1-methylpentyl, 3-ethyl-2-methylpentyl, 3-ethyl-3-methylpentyl, 3-ethyl-4-methylpentyl, 1,1,2,2-tetramethylbutyl, 1,1,2,3-tetramethylbutyl, 1,1,3,3-tetramethylbutyl, 1,2,2,3-tetramethylbutyl, 1,2,3,3-tetramethylbutyl, 1-ethyl-1,2-dimethylbutyl, 1-ethyl-1,3-dimethylbutyl, 1-ethyl-2,2-dimethylbutyl, 1-ethyl-2,3-dimethylbutyl, 1-ethyl-3,3-dimethylbutyl, 2-ethyl-1,1-dimethylbutyl, 2-ethyl-1,2-dimethylbutyl, 2-ethyl-1,3-dimethylbutyl, 2-ethyl-2,3-dimethylbutyl, 2-ethyl-3,3-dimethylbutyl, 1,1-diethylbutyl, 1,2-diethylbutyl, or 2,2-diethylbutyl.

Preferably $R^1$ is methyl or 2-ethylhexyl. More preferably $R^1$ is methyl.

Preferably substantially all of the acid groups of the epoxidised carboxylic acid ester (a) are esterified. Preferably the epoxidised carboxylic acid ester (a) suitably contains less than 10%, suitably less than 5%, suitably less 4%, suitably less than 3%, suitably less than 2%, preferably less than 1% free acid groups based on the total number of free acid groups and esterified acid groups.

Suitably the epoxidised carboxylic acid ester (a) comprises an epoxidised fatty acid ester. Suitably in the fatty acid R is an unbranched aliphatic group, preferably having 4 to 28 carbon atoms, for example 10 to 24 carbon atoms. Suitably the epoxidised carboxylic acid ester (a) is obtained by the epoxidation of a fatty acid, preferably a naturally occurring fatty acid.

Suitably the epoxidised carboxylic acid ester (a) is derived from an unsaturated (including polyunsaturated) fatty acid.

Suitably the epoxidised carboxylic acid ester (a) is derived from an unsaturated fatty acid selected from myristoleic acid, palmitoleic acid, sapienic acid, oleic acid, elaidic acid, vaccenic acid, gadoleic acid, eicosenoic acid, erucic acid, nervonic acid, linoleic acid, eicosadienoic acid, docosadienoic acid, linolenic acid, α-linoleic acid, pinolenic acid, eleostearic acid, mead acid, dihomo-γ-linolenic acid, eicosatrienoic acid, stearidonic acid, arachidonic acid, eicosatetraenoic acid, adrenic acid or mixtures thereof.

In preferred embodiments the epoxidised carboxylic acid ester (a) is derived from a naturally occurring unsaturated fatty acid or a combination of naturally occurring unsaturated fatty acids. In one especially preferred embodiment the epoxidised carboxylic acid ester (a) is derived from soybean oil fatty acid. Suitably the soybean oil fatty acid is derived from soybean oil which is a mixture of triglycerides comprising palmitic, linoleic and oleic fatty acid moieties. Suitably the soybean oil is hydrolysed to form free fatty acids comprising palmitic, linoleic and oleic fatty acids. This mixture is then esterified and epoxidized using known methods to produce component (a).

Thus the epoxidised carboxylic acid ester (a) preferably comprises an epoxidised soybean oil ester. Suitably the epoxidised carboxylic acid ester (a) comprises epoxidised palmitic, linoleic and oleic fatty acid esters, suitably epoxidised palmitic, linoleic and oleic fatty acid methyl esters.

Suitable epoxidised fatty acid esters include epoxidised soybean oil 2-ethylhexyl ester and epoxidised soybean oil methyl ester.

In embodiments in which the epoxidised carboxylic acid ester (a) is derived from a polyunsaturated fatty acid, the compound may comprise one or more epoxy groups. In some such embodiments the epoxidised carboxylic acid ester (a) may comprise compounds in which all of the alkene functional groups are epoxidised and/or it may comprise compounds in which one or more alkene groups are epoxidised and one or more alkene groups remain unreacted.

In some embodiments the epoxidised carboxylic acid ester (a) may comprise at least one epoxidised carboxylic acid ester containing one epoxy group and at least one epoxidised carboxylic acid ester containing at least two epoxy groups, suitably two epoxy groups.

Some epoxidised carboxylic acid esters (a) are commercially available. Such compounds may also be prepared from unsaturated carboxylic acids and/or esters thereof by methods known to those skilled in the art.

Unsaturated carboxylic acid esters are typically obtained from natural sources by transesterification of naturally occurring triglycerides and/or by esterification of the alcohol and the fatty acid.

The epoxidised carboxylic acid ester (a) may be obtained at least partially from renewable sources. Preferably the epoxidised carboxylic acid ester (a) is obtained from entirely renewable sources, for example from soybean oil.

Compound (b) includes at least one reactive alcohol and/or amino functional group. Such groups are suitably able to react with epoxy groups. Suitably the reactive alcohol and/or amino functional groups are especially able to react with secondary epoxy groups.

Preferably compound (b) comprises a compound which includes at least two reactive alcohol and/or amino functional groups. In some embodiments the compound may include at least three reactive alcohol and/or amino functional groups. In some embodiments the compound may include at least four reactive alcohol and/or amino functional groups. Compound (b) preferably comprises a compound including two reactive alcohol and/or amino functional groups.

In some embodiments compound (b) includes a compound having one reactive alcohol functional group. In some embodiments compound (b) includes a compound having two reactive alcohol functional groups. In some embodiments compound (b) includes a compound having one reactive amino functional group. In some embodiments compound (b) includes a compound having two reactive amino functional groups. In some embodiments compound (b) includes a compound having one reactive alcohol functional group and one reactive amino functional group.

In embodiments where compound (b) includes a compound having reactive alcohol functional groups, the reactive alcohol functional groups are preferably primary alcohol groups.

In embodiments where compound (b) includes a compound having reactive amino functional groups, the reactive amino functional groups are suitably primary amino groups or secondary amino groups. In preferred embodiments, the reactive amino functional groups are primary amino groups.

Compound (b) preferably comprises a compound of formula (I):

$$R^5-\left[X-R^4\right]_n-XH \quad \text{(I)}$$

wherein n is 0 or a positive integer; each X is independently O or NH; each group $R^4$ is independently an optionally substituted alkylene, alkenylene or arylene group; and $R^5$ is hydrogen or an optionally substituted alkyl, alkenyl, aryl, alkaryl or aralkyl group provided that n is not 0 when $R^5$ is hydrogen.

In some embodiments n is no more than 300, suitably no more than 250, preferably no more than 200, preferably no more than 150, for example no more than 100.

In some embodiments n is 1.

In some embodiments n is 1 to 20.

In some embodiments n is 10 to 200, for example 10 to 100 or 10 to 50.

Each X may be the same or different.

In some embodiments, each X is O. In some embodiments, each X is NH. In some embodiments, at least one X is O and at least one X is NH.

Each $R^4$ is an optionally substituted alkylene, alkenylene or arylene group. Preferably each $R^4$ is an unsubstituted alkylene, alkenylene or arylene group, more preferably an unsubstituted alkylene or alkenylene group.

When $R^4$ is substituted, preferred substituents are amino and hydroxy substituents.

In some embodiments each $R^4$ is an unsubstituted alkenylene group. Suitably the alkenylene group may comprise one or more double bonds, for example one or two double bonds, suitably one double bond.

Preferably each $R^4$ is an unsubstituted alkylene group.

Each $R^4$ has at least 1 carbon atom. Suitably each $R^4$ has up to 18 carbon atoms, preferably up to 16 carbon atoms, more preferably up to 14 carbon atoms. In preferred embodiments each $R^4$ has from 1 to 12 carbon atoms, preferably from 1 to 8 carbon atoms, for example from 1 to 4 carbon atoms. Each $R^4$ may be straight chain or branched. $R^4$ may be cyclic.

In some preferred embodiments each $R^4$ is an unsubstituted alkylene group having 1 to 12, preferably 1 to 6, for example 2, 3 or 4 carbon atoms.

Each $R^4$ may be the same or different.

In some embodiments n is 1, $R^5$ is H and compound (b) comprises a compound of formula (IA):

$$HX^1-R^4-X^2H \quad \text{(IA)}$$

In some embodiments $X^1$ is O and $X^2$ is NH.

In some embodiments $X^1$ and $X^2$ are both O.

In some embodiments $X^1$ and $X^2$ are both NH.

In some embodiments each X is NH, n is more than 1, $R^5$ is H and compound (b) comprises a polyamine, suitably a polyalkylene polyamine.

Preferred polyalkylene polyamines are polyethylene polyamine comprising 1 to 12 ethylene groups.

In some embodiments each X is NH, n is 1, $R^5$ is H and compound (b) comprises a diamine, for example an alkylene diamine.

In some embodiments each X is O, n is 1, $R^5$ is H and compound (b) comprises a diol.

In some embodiments each X is O, n is 1, $R^5$ is H, $R^4$ is a hydroxy substituted alkylene group and compound (b) comprises a polyol, for example a sugar or a sugar alcohol. Examples of suitable sugars include monosaccharides, disaccharides, and polysaccharides.

In some embodiments each X is O, $R^5$ is H and compound (b) comprises a glycol, suitably a polyalkylene glycol. Examples of suitable polyalkylene glycols include polyethylene glycol, polypropylene glycol, polybutylene glycol, and polytetramethylene ether glycol.

In some embodiments each terminal X is NH, all other groups X are O, $R^5$ is H and compound (b) comprises a polyetheramine.

Preferably in the compound of formula (I) each X is O, $R^5$ is H and each $R^4$ is $CH_2CH_2$, $CH(CH_3)CH_2$ (or $CH_2CH(CH_3)$), $CH(CH_2CH_3)CH_2$ (or $CH_2CH(CH_2CH_3)$) or $CH_2CH_2CH_2CH_2$.

Preferred polyalkylene glycols for use herein have a weight average molecular weight (Mw) of at least 100 g/mol, suitably at least 200 g/mol, for example at least 300 g/mol, for example at least 400 g/mol. Suitably the polyalkylene glycol has a weight average molecular weight of less than 3000 g/mol, suitably less than 2500 g/mol, for example less than 2200 g/mol. In preferred embodiments the polyalkylene glycol has a weight average molecular weight of from 100 to 3000 g/mol, preferably from 200 to 2500 g/mol, for example from 400 to 1500 g/mol.

Suitably component (b) is a polyethylene glycol with the above preferred molecular weights.

In some embodiments the polyalkylene glycol may comprise a mixture of ethylene oxide derived units and propylene oxide derived units.

In some embodiments $R^5$ is not hydrogen.

In such embodiments $R^5$ is an optionally substituted alkyl, alkenyl, aryl, alkaryl or aralkyl group. Preferably $R^5$ is an unsubstituted alkyl, alkenyl, aryl, alkaryl or aralkyl group, more preferably an unsubstituted alkyl or alkenyl group.

In some embodiments $R^5$ is an unsubstituted alkyl group.

In some embodiments $R^5$ is an unsubstituted alkenyl group. Suitably the alkenyl group may comprise one or more double bonds, for example one or two double bonds, suitably one double bond.

$R^5$ suitably has at least 1 carbon atom. Suitably $R^5$ has up to 22 carbon atoms, preferably up to 20 carbon atoms, more preferably up to 18 carbon atoms. In preferred embodiments $R^5$ has from 1 to 18 carbon atoms, preferably from 1 to 12 carbon atoms, for example from 1 to 8 carbon atoms. $R^5$ may be straight chain or branched.

In some embodiments n is 0 and compound (b) comprises a compound of formula (IB):

$$R^5-XH \quad \text{(IB)}$$

wherein X and $R^5$ are as defined above.

In some embodiments compound (b) comprises an allylic alcohol, suitably allyl alcohol or an allyl alcohol alkoxylate. Examples of suitable allyl alcohol alkoxylates include allyl alcohol ethoxylate and allyl alcohol propoxylate.

In some embodiments compound (b) comprises an alkoxylated compound, especially ethoxylated and/or propoxylated compounds.

Suitable alkoxylated compounds include polyalkylene glycols described above. Other suitable alkoxylated compounds include alkoxylated amines and diamines, alkoxylated alkanolamines and alkoxylated alcohols. Such compounds will be known to the person skilled in the art and are often available from a commercial source.

Compound (b) may comprise a mixture of compounds.

In some embodiments compound (b) may comprise a compound of formula (I) wherein $R^5$ is hydrogen and a compound of formula (I) wherein $R^5$ is not hydrogen, for example wherein $R^5$ is an unsubstituted alkyl or alkenyl group.

In some preferred embodiments the epoxidised carboxylic acid ester (a) comprises an epoxidised fatty acid ester, and compound (b) comprises a compound including at least two reactive alcohol and/or amino functional groups.

In some preferred embodiments the epoxidised carboxylic acid ester (a) comprises a methyl ester or 2-ethylhexyl ester of an epoxidised fatty acid and compound (b) comprises a polyalkylene glycol compound including at least two reactive primary alcohol and/or primary amino functional groups.

In some preferred embodiments the epoxidised carboxylic acid ester (a) comprises an epoxidised soybean oil methyl ester and compound (b) is selected from polyethylene glycol, polytetramethylene ether glycol, polypropylene glycol, polypropylene glycol diamine and allyl alcohol ethoxylate.

In some embodiments compound (b) is obtained at least partially from renewable sources. In some preferred embodiments compound (b) is obtained entirely from renewable sources.

To form the dispersing agent of the present invention the epoxidised carboxylic acid ester (a) and compound (b) are suitably reacted in a molar ratio of from 5:1 to 1:20, suitably 10:1 to 1:10, suitably from 5:1 to 1:2, preferably from 3:1 to 1:1, for example from 2.5:1 to 1.5:1, suitably approximately 2:1.

In some embodiments the epoxidised carboxylic acid ester (a) and compound (b) are reacted in relative amounts such that the ratio of epoxy groups to reactive alcohol and/or amine groups in said epoxidised carboxylic acid ester (a) and compound (b) is from 1:0.5 to 1:5, suitably from 1:0.5 to 1:2, for example approximately 1:1.

The epoxidised carboxylic acid ester (a) and compound (b) are suitably reacted under substantially anhydrous conditions. Water produced during the reaction may be removed. Performing such a reaction and selecting appropriate conditions will be within the competence of the person skilled in the art.

Suitably the epoxidised carboxylic acid ester (a) and compound (b) are reacted in the presence of a catalyst. Any suitable catalyst may be used and the selection of a catalyst will be within the competence of the skilled person. Suitably the catalyst is an acid. The reaction may be carried out in the presence of an acid, for example a Lewis or a Brønsted acid. Suitable catalysts include Lewis acid catalysts. Suitable Lewis acid catalysts include boron compounds, for example boron trifluoride or boron trichloride. One preferred catalyst is boron trifluoride etherate.

Suitably the reaction of the epoxidised carboxylic acid ester (a) and compound (b) is carried out at a temperature below 200° C., preferably below 150° C., for example below 100° C. Suitably the reaction temperature is maintained between 80 and 20° C.

As the skilled person will appreciate, the reaction product of an epoxidised fatty acid ester (a) and amino/alcohol compound (b) will depend on the nature of compounds (a) and (b), ratio of compounds used and the reaction conditions. In preferred embodiments in which compound (b) comprises a compound including at least 2 amino or alcohol functional groups, a mixture of compounds may be formed.

The reaction product of the epoxidised carboxylic acid ester (a) and compound (b) may include a compound of formula (IIA):

(IIA)

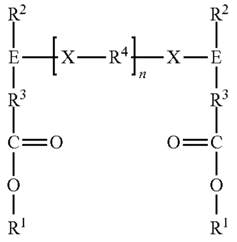

formed by the reaction of one molecule of compound (b) and two molecules of the epoxidised carboxylic acid ester (a).

The reaction product of the epoxidised carboxylic acid ester (a) and compound (b) may include a compound of formula (IIB):

(IIB)

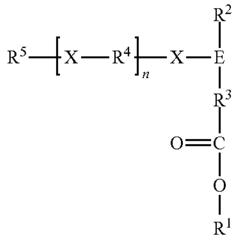

formed by the reaction of one molecule of the epoxidised carboxylic acid ester (a) and one molecule of compound (b).

The reaction product of the epoxidised carboxylic acid ester (a) and compound (b)may include a compound of formula (IIC):

(IIC)

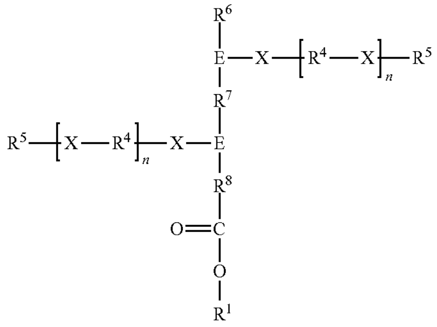

formed by the reaction of one molecule of the epoxidised carboxylic acid ester (a) and two molecules of compound (b).

The skilled person will appreciate that in embodiments in which $R^5$ is not hydrogen, compounds of formula (IIA) will not form.

In embodiments in which $R^5$ is hydrogen, and the ester (a) includes more than one epoxy functional group, more complex structures may also be formed, for example as shown in formulae (IID), (IIE) and (IIF):

(IID)

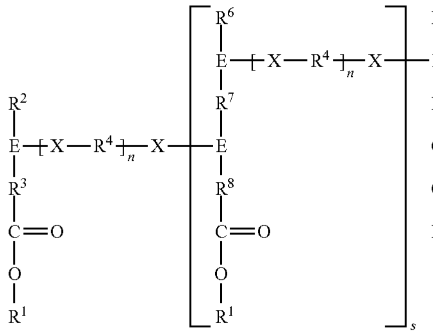

(IIE)

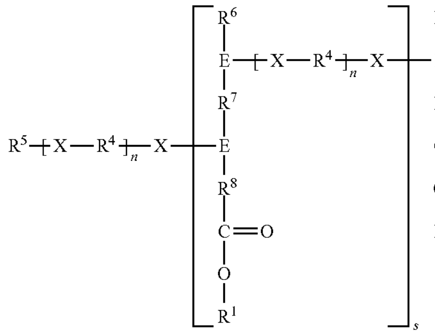

(IIF)

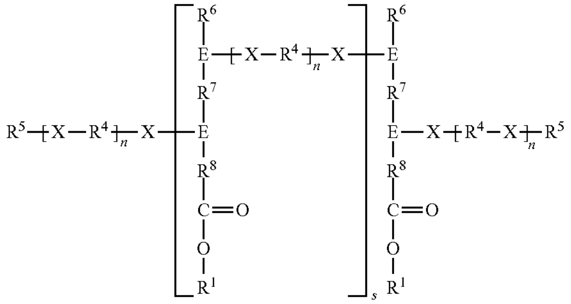

In each of structures (IIA), (IIB), (IIC), (IID), (IIE) and (IIF), E is the residue of an epoxy group having the structure:

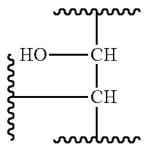

or

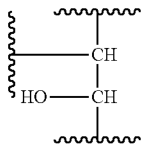

Suitably $R^2$, $R^3$, $R^6$, $R^7$, and $R^8$ are each independently optionally substituted hydrocarbyl groups, preferably unsubstituted straight chain hydrocarbyl groups. In preferred embodiments $R^2$ and $R^3$ together have a total of from 8 to 20 carbon atoms, and $R^6$, $R^7$, and $R^8$ together have a total of from 6 to 18 carbon atoms.

s is preferably from 1 to 4.

X, $R^1$, $R^4$, $R^5$, and n are as previously defined herein.

The reaction product of the epoxidised carboxylic acid ester (a) and compound (b) will typically comprise a mixture of compounds having the above structures depending on the starting compounds, the ratios reacted and the reaction conditions.

The derivatising agent (c) suitably comprises a compound which can react with a functional group present in the reaction product of the epoxidised carboxylic acid ester (a) and compound (b).

Functional groups which may be present in the reaction product of the epoxidised carboxylic acid ester (a) and compound (b) include esters, alkenes, hydroxy, epoxy and amino groups.

These functional groups may be present within the residue of the epoxidised carboxylic acid ester (a), for example an ester functional group or an alkene or residual epoxy group.

These functional groups may alternatively or additionally be present in the residue of the compound (b), for example a hydroxy or amino group. When compound (b) comprises a compound of formula $R^5$-[X-$R^4$]-XH and $R^5$ is not hydrogen, $R^5$ may contain a functional group, for example a halide or alkene moiety. In some preferred embodiments $R^5$ comprises a terminal alkene group.

Suitably the direct product of the reaction of (a) and (b) is used to react with (c) to form the dispersing agent. Suitably no purification of the reaction mixture of (a) and (b) is carried out before reaction with (c), aside from optionally neutralising any acid used in the reaction.

The derivatising agent (c) is suitably selected depending on the functional group present in the reaction product of the epoxidised carboxylic acid ester (a) and compound (b).

Suitably the derivatising agent includes a first functional group able to react with the reaction product of the epoxidised carboxylic acid ester (a) and compound (b) and a second functional group.

In some embodiments the derivatising agent (c) may undergo an addition reaction with the reaction product of the epoxidised carboxylic acid ester (a) and compound (b), for example to a double bond.

Suitably reaction with the derivatising agent (c) introduces a polar functional group into the dispersing agent product. This polar functional group may be selected from anionic, non-ionic or cationic functional groups.

The polar functional group may be selected from a sulfonate moiety, a sulfate moiety, a carboxylate moiety, a quaternary ammonium moiety, a phosphonate moiety, a phosphate moiety, a hydroxy group, an amino group and/or an alkoxylated chain.

In some embodiments the derivatising agent (c) comprises a hydrolysis agent (i.e. a reactant capable of hydrolysing an ester). Such compounds may hydrolyse an ester moiety within the reaction product of the epoxidised carboxylic acid ester (a) and compound (b), suitably the ester residue of the epoxidised carboxylic acid ester (a). The species formed suitably comprises a carboxylate moiety. Conditions for carrying out such reactions will be well known to the skilled person.

Suitable hydrolysis agents will be known to the skilled person. Hydrolysis may be carried out under basic or acidic conditions. Examples of suitable basic hydrolysis agents include sodium hydroxide, potassium hydroxide and ammonium hydroxide. Acidic hydrolysis may be carried out in the presence of any strong acid. Neutralisation may follow to provide an alkali metal, amine or ammonium salt.

In some embodiments the derivatising agent (c) comprises a compound including at least one reactive alcohol or amino functional group.

Such compounds may react with a substituted leaving group within the residue of the epoxidised carboxylic acid ester (a) or compound (b). Suitably such groups undergo a trans-esterification or amidation reaction with the ester residue of the epoxidised carboxylic acid ester (a). Conditions for carrying out such reactions will be well known to the skilled person.

In embodiments where the derivatising agent (c) includes a compound having a reactive alcohol functional group, the reactive alcohol functional group is suitably a primary alcohol group or a secondary alcohol group. In preferred embodiments, the reactive alcohol functional group is a primary alcohol group.

In embodiments where the derivatising agent (c) includes a compound having a reactive amino functional group, the reactive amino functional group is suitably a primary amino group or a secondary amino group. In preferred embodiments, the reactive amino functional group is a primary amino group.

In some embodiments the derivatising agent (c) comprises a compound of formula (III):

$$R^{10}\!\left[X^3-R^9\right]_p X^4H \qquad \text{(III)}$$

wherein p is 0 or a positive integer, each $X^3$ is independently O or $NR^{11}$, $X^4$ is O or $NR^{12}$, each $R^9$ is independently an optionally substituted alkylene, alkenylene or arylene group, and each of $R^{10}$, $R^{11}$ and $R^{12}$ is hydrogen or an optionally substituted alkyl, alkenyl, aryl, alkaryl or aralkyl group.

Preferably p is a positive integer.

In some embodiments p is no more than 300, suitably no more than 250, preferably no more than 200, preferably no more than 150, for example no more than 100.

In some embodiments p is 1.

In some embodiments p is 1 to 20.

In some embodiments p is 10 to 200, for example 10 to 100 or 10 to 50.

Each $X^3$ may be the same or different.

In some preferred embodiments $R^{11}$ is H and $X^3$ is O or NH.

In some embodiments, each $X^3$ is O or NH. In some embodiments, at least one $X^3$ is O and at least one $X^3$ is NH. In preferred embodiments each $X^3$ is O.

In some embodiments each $X^3$ is O and $X^4$ is O. In some embodiments each $X^3$ is O and $X^4$ is NH.

Each $R^9$ is an optionally substituted alkylene, alkenylene or arylene group. Preferably each $R^9$ is an unsubstituted alkylene, alkenylene or arylene group, more preferably an unsubstituted alkylene or alkenylene group.

When $R^9$ is substituted, preferred substituents are amino and hydroxy substituents.

In some embodiments each $R^9$ is an unsubstituted alkenylene group. Suitably the alkenylene group may comprise one or more double bonds, for example one or two double bonds, suitably one double bond.

Preferably each $R^9$ is an unsubstituted alkylene group.

Each $R^9$ has at least 1 carbon atom. Suitably each $R^9$ has up to 18 carbon atoms, preferably up to 16 carbon atoms, more preferably up to 14 carbon atoms. In preferred embodiments each $R^9$ has from 1 to 12 carbon atoms, preferably from 1 to 8 carbon atoms, for example from 1 to 4 carbon atoms. Each $R^9$ may be straight chain or branched. $R^9$ may be cyclic.

In some preferred embodiments each $R^9$ is an unsubstituted alkylene group having 1 to 12, preferably 1 to 6, for example 2, 3, or 4 carbon atoms.

Each $R^9$ may be the same or different.

$R^{10}$ is hydrogen or an optionally substituted alkyl, alkenyl, aryl, alkaryl or aralkyl group. Preferably $R^{10}$ is not hydrogen. Preferably $R^{10}$ is an unsubstituted alkyl, alkenyl, aryl, alkaryl or aralkyl group, more preferably an unsubstituted alkyl or alkenyl group.

When $R^{10}$ is substituted, hydroxy substituents are preferred.

In some embodiments $R^{10}$ is an unsubstituted alkenyl group. Suitably the alkenyl group may comprise one or more double bonds, for example one or two double bonds, suitably one double bond.

In preferred embodiments $R^{10}$ is an alkyl group. Preferred alkyl groups are unsubstituted alkyl groups and hydroxy substituted alkyl groups. Unsubstituted alkyl groups are especially preferred.

$R^{10}$ has at least 1 carbon atom. Suitably $R^{10}$ has up to 22 carbon atoms, preferably up to 20 carbon atoms, more preferably up to 18 carbon atoms. In preferred embodiments $R^{10}$ has from 1 to 18 carbon atoms, preferably from 1 to 12 carbon atoms, for example from 1 to 8 carbon atoms. $R^{10}$ may be straight chain or branched.

In some embodiments the derivatising agent (c) comprises an alkoxylated compound.

Suitable alkoxylated compounds include alkoxy polyalkylene glycols and alkoxy polyalkylene glycol amines, wherein the polyalkylene glycol portion is preferably selected from polyethylene glycol, polypropylene glycol, polybutylene glycol, polytetramethylene ether glycol, and copolymers thereof, and the alkoxy portion is preferably selected from methoxy, ethoxy, propoxy, and butoxy.

Examples of suitable alkoxy polyalkylene glycols and alkoxy polyalkylene glycol amines include methoxy polyethylene glycol, butoxy polypropylene glycol, and butoxy poly(ethylene glycol-co-propylene glycol) amine.

In some embodiments p is at least 10, each $X^3$ is O, $X^4$ is O, each $R^9$ is an unsubstituted alkylene or alkenylene group, preferably a $C_1$ to $C_4$ alkyl group, and $R^{10}$ is hydrogen or an unsubstituted alkyl or alkenyl group, preferably a $C_1$ to $C_4$ alkyl group.

In some embodiments p is 1, $R^{10}$ is hydrogen, $X^3$ is O or NH and $R^4$ is O, NH or $NR^{12}$ wherein $R^{12}$ is preferably an alkyl group or a hydroxy alkyl group.

In some embodiments $R^{10}$ is alkyl, preferably unsubstituted alkyl or hydroxy alkyl, p is 0 and $X^4$ is $NR^{12}$ wherein $R^{12}$ is alkyl, preferably unsubstituted alkyl or hydroxy alkyl.

In some embodiments the derivatising agent (c) may be a primary or secondary amine, for example an alkyl amine, a dialkyl amine, an alkanolamine or a dialkanolamine. Such compounds typically include 1 to 12 carbon atoms in each alkyl or hydroxy alkyl group, preferably from 1 to 8 carbon atoms, most preferably from 1 to 4 carbon atoms.

Examples of suitable compounds of this type include monoethanolamine, monoisopropanolamine, diethanolamine, and diisopropanolamine.

In some embodiments the derivatising agent (c) comprises a compound including at least one reactive alcohol or amino functional group and one tertiary amino group. Suitable compounds including at least one reactive alcohol or amine functional group and one tertiary amino group include dialkylamino alkylamines and dialkylamino alcohols. In some embodiments $R^{10}$ is alkyl, preferably $C_1$ to $C_{14}$ alkyl, $X^3$ is $NR^{11}$ and $R^{11}$ is alkyl, preferably $C_1$ to $C_{14}$ alkyl, $R^9$ is alkylene and $X^4$ is NH or O. In some embodiments p is 1, $X^3$ is $NR^{11}$, $X^4$ is NH, $R^9$ is an unsubstituted $C_1$ to $C_8$ alkylene group, and $R^{10}$ and $R^{11}$ are independently an unsubstituted $C_1$ to $C_4$ alkyl group.

Such derivatising agents may react to form a species which further includes a tertiary amine. This tertiary amine group can be reacted with a quaternising agent to introduce cationic functionality into the molecule.

Examples of suitable compounds of this type include dimethylaminopropylamine (DMAPA), dimethylaminopropanol and dimethylaminoethanol. In some embodiments (c) is DMAPA.

Other suitable compounds of this type will be known to the person skilled in the art.

In some embodiments, the dispersing agent is prepared by:

(i) reacting (a) an epoxidised carboxylic acid ester with (b) a compound including at least one reactive alcohol and/or amino functional group;

(ii) reacting the reaction product of step (i) with (c) a derivatising agent comprising a compound including at least one reactive alcohol or amino functional group and one tertiary amino group; and (iii) reacting the reaction product of step (ii) with (d) a quaternising agent.

Suitable quaternising agents will be known to the skilled person. Examples of suitable quaternising agents include dimethyl sulfate, diethyl sulfate, methyl chloride, methyl bromide, benzyl chloride, monochloroacetic acid and epoxides in combination with an acid.

In embodiments where the reaction product of the epoxidised carboxylic acid ester (a) and compound (b) comprises an alkene functional group, the derivatising agent (c) may comprise a sulfonating agent.

Suitable sulfonating agents will be known to the skilled person. Examples of suitable sulfonating agents include sodium bisulfite, sodium metabisulfite, potassium bisulfite, and potassium metabisulfite.

Selection of suitable reaction conditions and ratios of reagents for reacting the derivatising agent (c) with the reaction product of the epoxidised carboxylic acid ester (a) and compound (b) will be within the competence of the skilled person.

In some embodiments a catalyst will be needed.

Suitable catalysts will be known to the person skilled in the art. In embodiments where the derivatising agent (c) comprises a compound of formula (III), an alkoxide catalyst may be used. Suitable alkoxide catalysts include alkali metal alkoxides, such as sodium alkoxides. In one embodiment a sodium methoxide catalyst may be used.

Suitably the reaction of the derivatising agent (c) with the reaction product of the epoxidised carboxylic acid ester (a) and compound (b) is carried out at a temperature below 200° C., preferably below 150° C., for example below 100° C.

It will appreciated that in embodiments where the derivatising agent (c) comprises a compound of formula (III), the dispersing agent may include compounds corresponding to one or more of structures (IIA), (IIB), (IIC), (IID), (IIE), and (IIF) wherein —$R^1$ is replaced by the a group -$X^4$-[$R^9$-$X^3$]$_p$-$R^{10}$ wherein $X^3$, $X^4$, $R^9$, $R^{10}$ and p are as defined above.

For example, the dispersing agent may include a compound of formula (IVA):

(IVA)

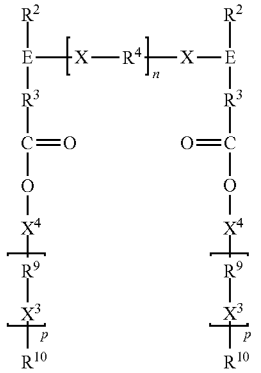

formed by the reaction of one molecule of a compound of formula (IIA) and two molecules of a compound of formula (III).

The dispersing agent may include a compound of formula (IVB):

(IVB)

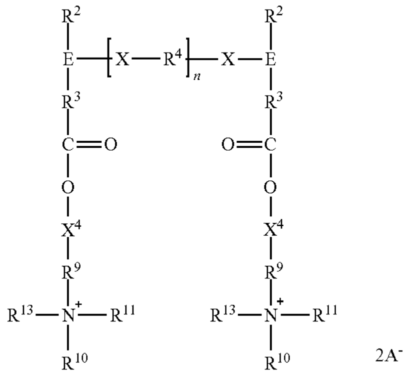

formed by the reaction of one molecule of a compound of formula (IIA) and two molecules of a compound of formula (III) wherein p is 1, $X^3$ is $NR^{11}$, and $R^{10}$ and $R^{11}$ are independently an optionally substituted alkyl, alkenyl, aryl, alkaryl or aralkyl group, followed by reaction with a quaternising agent.

In structure (IVB), $R^{13}$ is an optionally substituted alkyl, alkenyl, aryl, alkaryl or aralkyl group, suitably an optionally substituted alkyl group, preferably an unsubstituted $C_1$ to $C_{14}$ alkyl group. $A^-$ is an anion. Suitably $A^-$ is an organic anion, for example a carboxylate or carbonate anion, or an inorganic anion, for example a halide or sulfate anion. In some embodiments $A^-$ is a carboxylate anion.

The dispersing agent may include a compound of formula (IVC):

(IVC)

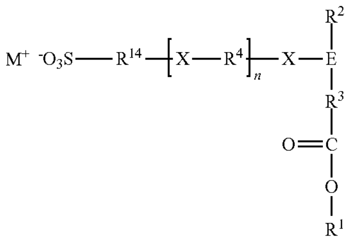

formed by the reaction of a compound of formula (IIB) wherein $R^5$ is an alkenyl group and a sulfonating agent.

In structure (IVC), $R^{14}$ is an alkylene group, and $M^+$ is a cation. Suitably $M^+$ is a metal cation, for example a sodium or potassium cation. In some embodiments $M^+$ is a sodium cation.

Unless otherwise specified X, $X^3$, $X^4$, $R^1$, $R^2$, $R^3$, $R^4$, $R^9$, $R^{10}$, E, n, and p in structures (IVA), (IVB) and (IVC) are as previously defined herein.

Based on the above examples it will be appreciated how the derivatising agent (c) may react with compounds of the formulae (IIB), (IIC), (IID), (IIE), and (IIF) as defined above to form a variety of structures.

The dispersing agent may be present in the dispersion in an amount of at least 5 wt %, suitably at least 10 wt %, for example at least 15 wt % based on the total weight of solids in the dispersion. In some embodiments the dispersing agent is present in an amount of from 5 to 40 wt %, suitably from 10 to 30 wt %, for example from 15 to 20 wt % based on the total weight of solids in the dispersion.

The dispersing agent may be present in the liquid dispersion in an amount of at least 1 wt %, suitably at least 3 wt %, suitably at least 6 wt %, of the total weight of the liquid dispersion. The dispersing agent may be present in the liquid dispersion in an amount of up to 30 wt %, suitably up to 20 wt %, suitably up to 15 wt % of the total weight of the liquid dispersion.

In some embodiments the dispersing agent is prepared by (i) reacting (a) an ester of formula $RCOOR^1$ in which R is a hydrocarbyl group including an epoxy functional group and $R^1$ is a hydrocarbyl group with (b) a compound of formula (I):

(I)

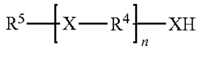

wherein n is 0 or a positive integer; each X is independently O or NH; each group $R^4$ is independently an optionally substituted alkylene, alkenylene or arylene group; and $R^5$ is hydrogen or an optionally substituted alkyl, alkenyl, aryl, alkaryl or aralkyl group provided that n is not 0 when $R^5$ is hydrogen; and (ii) reacting the reaction product of step (i) with (c) a compound of formula (III):

(III)

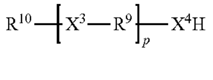

wherein p is 0 or a positive integer, each $X^3$ is independently O or $NR^{11}$, $X^4$ is O or $NR^{12}$, each $R^9$ is independently an optionally substituted alkylene, alkenylene or arylene group, and each of $R^{10}$, $R^{11}$ and $R^{12}$ is hydrogen or an optionally substituted alkyl, alkenyl, aryl, alkaryl or aralkyl group.

In some embodiments the dispersing agent is prepared by (i) reacting (a) an epoxidised soybean oil methyl ester with (b) a polyalkylene glycol; and (ii) reacting the reaction product of step (i) with (c) an alkoxy polyalkylene glycol, a dialkylamino alkylamine, or a dialkylamino alcohol, preferably an alkoxy polyalkylene glycol or a dialkylamino alkylamine.

The Solvent

The dispersion comprises one or more solvents. The solvent will be chosen according to the desired use of the dispersion. The dispersion may comprise one solvent. Alternatively, the dispersion may comprise two or more solvents. Suitably the dispersion comprises from 10 to 90 wt %, preferably from 20 to 85 wt %, for example from 30 to 80 wt % of the one or more solvents.

In some embodiments the one or more solvents comprise water. Such solvents are also known as aqueous solvents. One or more aqueous solvents may be present in the dispersion in an amount of from 20 to 70 wt %, suitably from 30 to 60 wt %, for example from 40 to 50 wt %.

In some embodiments the one or more solvents comprise a non-aqueous solvent. Suitable non-aqueous solvents include organic solvents such as alkanes, alkenes, alcohols, ethers, esters and aromatics. The non-aqueous solvent may be water-miscible. One or more non-aqueous solvents may be present in the dispersion in an amount of from 50 to 90 wt %, suitably from 60 to 85 wt %, for example from 70 to 80 wt %. In some embodiments the one or more solvents do not comprise water.

The dispersion may comprise one or more further components. The further components will depend on the intended use of the dispersion. Such further components will be known to the person skilled in the art and include, for example, resins, pH modifiers, humectants, binders, solvents, antifoaming agents, surfactants, biocides, rheology modifiers, extenders, silicones, UV stabilisers, catalysts, fillers, driers, and anti-settling agents.

In some embodiments the dispersion comprises a biocide, suitably in an amount of from 0.01 to 1 wt %, suitably from 0.05 to 0.5 wt % based on the total weight of solids in the dispersion. Biocides may be used where it is desirable to reduce adherence of biological organisms to the article or coating to be formed from the dispersion.

In some embodiments the dispersion comprises an antifoaming agent, suitably in an amount of from 0.01 to 1 wt %, suitably from 0.05 to 0.5 wt % based on the total weight of solids in the dispersion. Antifoaming agents may be used where it is desirable to reduce foaming during formation, storage or application of the dispersion.

According to a second aspect of the present invention, there is provided a method of producing a dispersion having long-term stability, the method comprising the steps of:

1) mixing together a dispersing agent and one or more solvents; and 2) adding a solid particulate component to form a dispersion, wherein the dispersing agent comprises a reaction product of:

(a) an epoxidised carboxylic acid ester;

(b) a compound including at least one reactive alcohol and/or amino functional group; and (c) a derivatising agent.

According to a third aspect of the present invention, there is provided the use of a dispersing agent to provide long-term stability to a dispersion comprising a solid particulate component and one or more solvents, wherein the dispersing agent comprises a reaction product of:

(a) an epoxidised carboxylic acid ester;

(b) a compound including at least one reactive alcohol and/or amino functional group; and (c) a derivatising agent.

The dispersions and dispersing agents in the second and third aspects are suitably as defined in relation to the first aspect.

By long-term stability, we mean that the dispersions may be stored for extended periods of time after the dispersion is prepared without significant change in their properties or appearance, for example without the particle size of the solid particulate component changing and/or without the viscosity of the liquid dispersion changing significantly and/or without visible agglomeration or flocculation of the solid particulate component. "Long-term" is suitably a period of at least 20 days, suitably at least 50 days, preferably at least 100 days, for example at least 1 year from the preparation of the dispersion.

One method of determining the stability of a dispersion is to assess the rate of change in viscosity. Stability may be defined as the viscosity of a dispersion changing by no more than 10 centipoise per day, suitably no more than 5 centipoise per day, for example no more than 1 centipoise per day, as measured by a Brookfield cone and plate viscometer.

In some embodiments the viscosity of the dispersion changes by no more than 10 centipoise per day over a period of 5 days from preparation of the dispersion. Suitably the viscosity of the dispersion changes by no more than 5 centipoise per day over a period of 20 days from preparation of the dispersion. Preferably the viscosity of the dispersion changes by no more than 1 centipoise per day over a period of 50 days from preparation of the dispersion.

Another indication of the stability of a dispersion of a solid particulate component is the tendency of the solid to flocculate. Flocculation may be detected visually by unevenness in the colour of a dispersion. Suitably the dispersing agent according to the second or third aspects prevents flocculation of the solid in the dispersion.

According to a fourth aspect of the present invention, there is provided a use of a dispersing agent to provide low flocculation in a dispersion comprising a solid particulate component and one or more solvents, wherein the dispersing agent comprises a reaction product of:

(a) an epoxidised carboxylic acid ester;

(b) a compound including at least one reactive alcohol and/or amino functional group; and (c) a derivatising agent.

The dispersion and dispersing agent is suitably as defined in relation to the first aspect.

According to a fifth aspect of the present invention, there is provided a paint, ink, polymer or coating composition comprising the dispersion according to the first aspect.

A paint, ink, polymer or coating composition according to the fifth aspect may comprise one or more further components.

The further components will depend on the intended use of the composition. Such further components will be known to the person skilled in the art and include, for example, resins, pH modifiers, humectants, binders, solvents, antifoaming agents, surfactants, biocides, rheology modifiers, extenders, silicones, UV stabilisers, catalysts, fillers, driers, and anti-settling agents.

A paint, ink, polymer or coating composition according to the fifth aspect may comprise one or more further solvents.

A paint composition according to the fifth aspect suitably comprises a polymer-forming component. The polymer-forming component suitably comprises one or more monomers. The monomers may be curable under mild or ambient conditions. The monomers may comprise ethylenically unsaturated monomers, such as vinyl monomers and acrylate monomers. In some embodiments the monomers comprise styrene and butyl acrylate.

An ink composition according to the fifth aspect may comprise a volatile solvent.

BRIEF DESCRIPTION OF THE DRAWINGS

For a better understanding of the invention, and to show how example embodiments may be carried into effect, reference will now be made to the accompanying drawings in which.

EXAMPLES

Example 1

Figure 1:
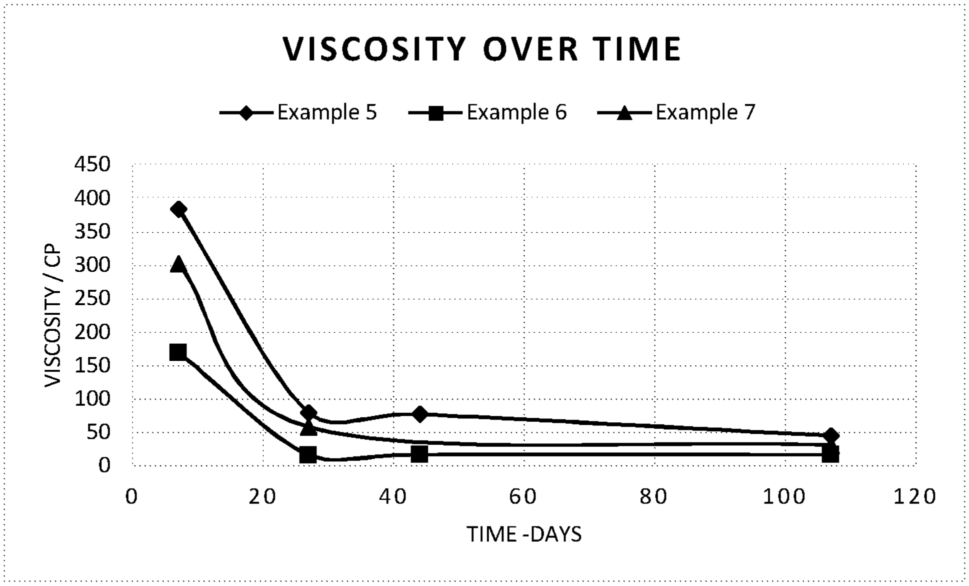
FIG. 1 shows the viscosity of Examples 5, 6 and 7 over time.

Reaction of Epoxidised Methyl Soyate with Polyethylene Glycol 1500 Molecular Weight 99.1 grams of epoxidised soyate with an epoxide value of 210 mg KOH/g was placed into a flask. 300.9 grams of 1500 molecular weight polyethylene glycol (1:1 equivalents epoxy to hydroxy) was then added. The mixture was dried to a water content of <0.1%, then cooled to 60° C. 0.32 grams of boron tetrafluoride etherate catalyst was added, and the reaction was cooled to maintain the temperature below 80° C. The reaction was continued until the epoxide value of the mixture was <1 mg KOH/g.

Example 2

Reaction of Epoxidised Methyl Soyate with Polyethylene Glycol 600 Molecular Weight 180.7 grams of epoxidised soyate with an epoxide value of 227 mg KOH/g was placed into a flask. 219.3 grams of 600 molecular weight polyethylene glycol (1:1 equivalents epoxy to hydroxy) was then added. The mixture was dried to a water content of <0.1%, then cooled to 30° C. 0.32 grams of boron tetrafluoride etherate catalyst was added, and the reaction was cooled to maintain the temperature below 60° C. The reaction was continued until the epoxide value of the mixture was <1 mg KOH/g.

Example 3

Derivatisation of Example 2 by Transesterification of the Ester Group with a Methyl Initiated Poly Ethylene Glycol of 1000 Molecular Weight (MPEG1000)

162.9 grams of example 2 was placed in a flask. 237.1 grams of MPEG1000 was then added. The mixture was dried to a water content of <0.1%, then cooled to 60° C. 1% of 20% sodium methoxide catalyst was then added, and vacuum was applied to distil the methanol from the catalyst and by-product from the reaction. The reaction mixture was slowly heated until distillation stopped.

Example 4

Derivatisation of Example 2 by Amidation of the Ester Group with Dimethylaminopropylamine (DMAPA)

342.8 grams of example 2 was placed in a flask and dried to <0.1% water content. 57.2 grams of DMAPA was then added (10% molar excess). The temperature was adjusted to 60° C., then 1% of 20% sodium methoxide catalyst was added, and the reaction mixture was slowly heated to 140° C. to distil the methanol from the catalyst and by-product from the reaction until distillation stopped. Once methanol distillation stopped, vacuum was applied and the reaction mixture was heated to 150° C. until the distillation of the excess DMAPA was complete.

Method of Preparation of Dispersions

Each formulation was prepared and mixed to form a mill-base using a high-speed stirrer. The pigment was slowly added to all the other components over a 10-minute period at a speed of 1000 rpm. The mill-base was then mixed for a further 5 minutes. Once the mill base was prepared the second stage of preparation was then carried out using a laboratory size beadmill. The dispersion was prepared using an Eiger Torrance bead mill set at 2000 rpm for 60 minutes.

Viscosity and Stability of Dispersions

The viscosity analysis was carried out by a combination of methods depending on the initial viscosity. For low viscosity dispersions flow cups DIN6 and DIN4 were used, while for medium viscosities a Brookfield cone and plate were used. Viscosities were periodically tested over reasonable time period, in order to determine the average storage stability.

Colour Analysis

Each pigment dispersion was incorporated into a styrene/butyl acrylate emulsion.

2.5 g of dispersion was added to 100 g of emulsion and then mixed thoroughly. The solution was then drawn down on a card and allowed to dry. The colour was then measured using a Konica-Minolta CM-5 to assess the CIELAB colour. The CIELAB color space (also known as CIE L*a*b* or sometimes abbreviated as simply "Lab" colour space) is a colour space defined by the International Commission on Illumination (CIE) in 1976. It expresses colour as three values: L* for the lightness from black (0) to white (100), a* from green (−) to red (+), and b* from blue (−) to yellow (+). CIELAB was designed so that the same amount of numerical change in these values corresponds to roughly the same amount of visually perceived change.

Flocculation Assessment

A known weight of each dispersion was added to a low-quality paint and the rub-out test was performed to assess the level of flocculation.

The paint is applied to a test card and after a short drying time (flash-off) the rub-out test was carried out by rubbing the paint film with a finger while it was still damp but already starting to dry. The instability or stability of the pigment dispersion was shown by the degree of colour difference evident between the rubbed area and the surrounding coating material.

Particle Size Analysis

Each dispersion was tested for particle size distribution by using a Mastersizer 2000.

Performance Examples

Formulation:

| | Example 5 (Comparative) | Example 6 | Example 7 |
|---|---|---|---|
| Pigment Red 112 | 50 | 50 | 50 |
| Lansperse DS200W[1] | 10 | — | — |
| Example 3 | — | 10 | — |
| Example 4 | — | — | 8 |
| Defoamer | 0.06 | 0.06 | 0.06 |
| Biocide | 0.07 | 0.07 | 0.07 |
| Water | 39.87 | 39.87 | 41.87 |

[1]Standard ethoxylated polyaromatic dispersing agent

Viscosity Analysis

The viscosity of Examples 5, 6 and 7 was measured at intervals over an extended period of time. The results are shown in FIG. 1. Examples 6 and 7 exhibited lower viscosity than conventional Example 5.

Colour Analysis

| | Example 5 (Comparative) | Example 6 | Example 7 |
|---|---|---|---|
| L | 48.60 | 47.68 | 48.94 |
| a | 61.22 | 62.54 | 60.59 |
| b | 29.46 | 33.02 | 28.71 |

Comparable colour strength was observed when comparing Example 6 and Example 7 against an industry standard.

Flocculation Assessment

Example 6 was added at 2% to chalk paint, which was applied to a test card. Virtually no flocculation was observed when carrying out the rub-out test.

Particle Size Analysis

Figure 2A:
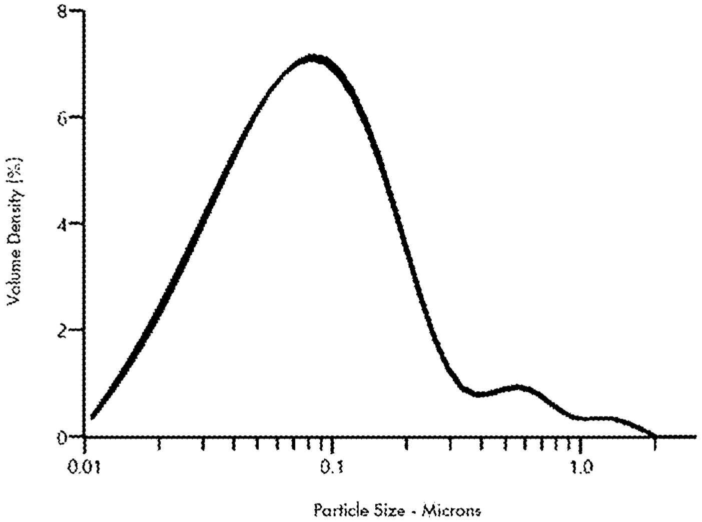
FIGS. 2*a* and 2*b* show the particle size analysis of Examples 5 and 6, respectively.
Figure 2B:
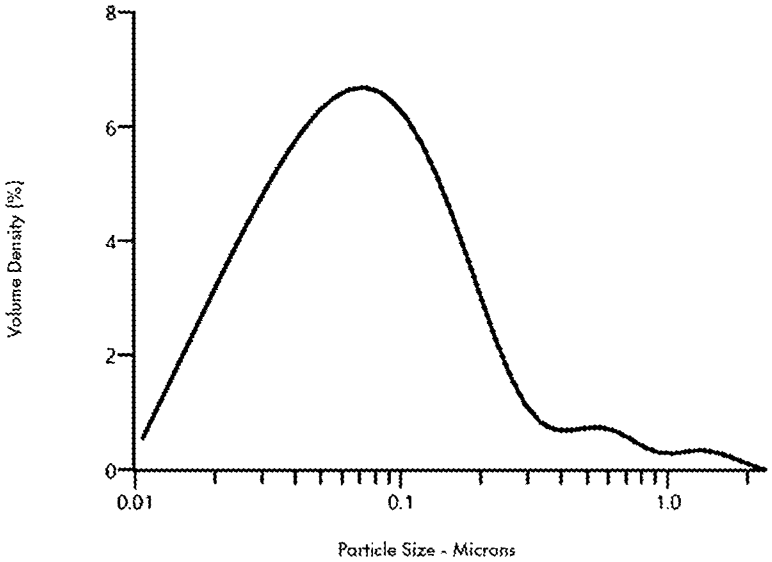

The particle size distributions of Examples 5 and 6 are shown in FIG. 2. The dispersions had comparable particle size distributions.

Formulation:

| | Example 8 (Comparative) | Example 9 | Example 10 |
|---|---|---|---|
| Pigment Yellow 74 | 45 | 45 | 45 |
| Lansperse DS200W | 8.75 | — | — |
| Example 3 | — | 8.75 | — |
| Example 4 | — | — | 7 |
| Defoamer | 0.06 | 0.06 | 0.06 |
| Biocide | 0.07 | 0.07 | 0.07 |
| Water | 46.12 | 46.12 | 47.87 |

Viscosity Analysis

Figure 3:
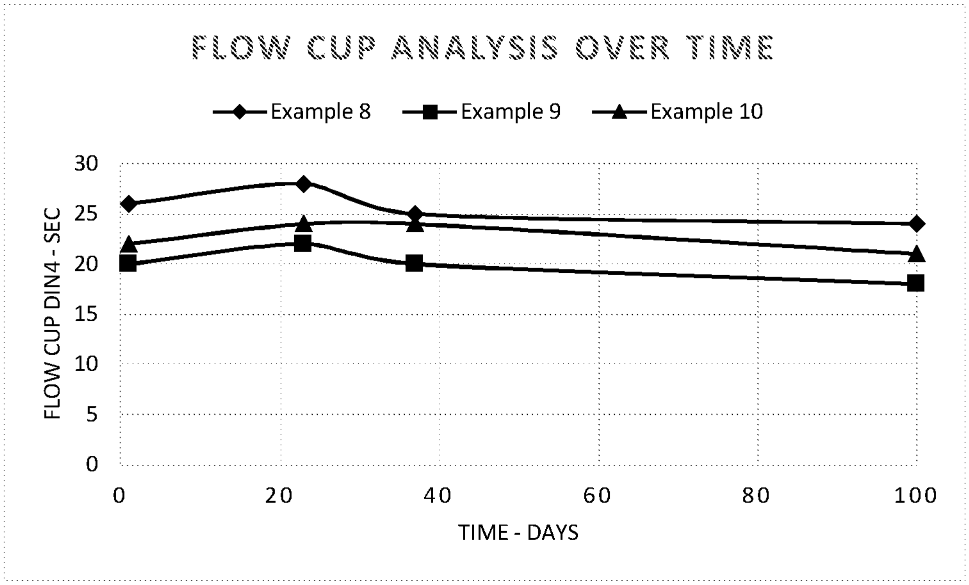
FIG. 3 shows the flow cup analysis of Examples 8, 9 and 10 over time.
Figure 4:
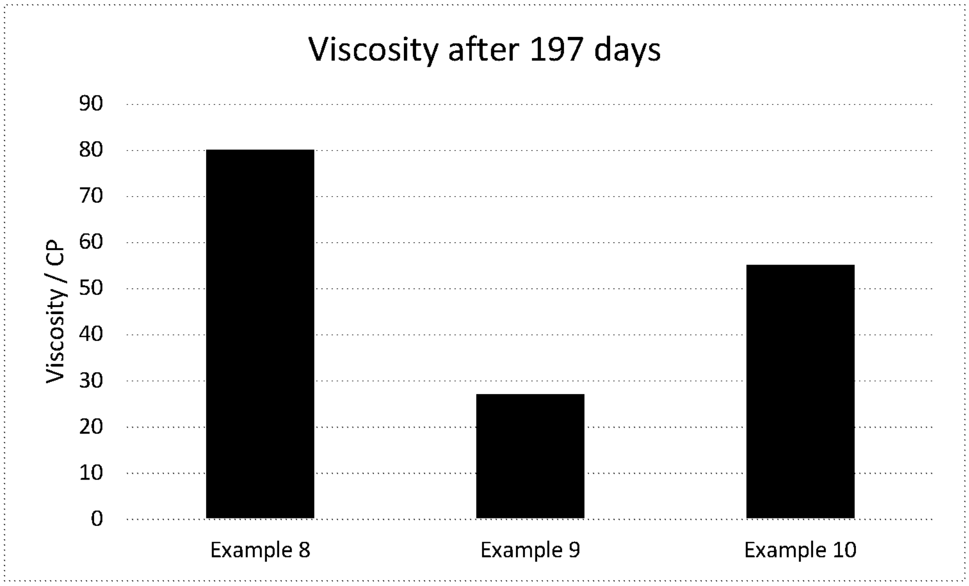
FIG. 4 shows the viscosity of Examples 8, 9 and 10 after 197 days.

Flow cup analysis was carried out on Examples 8, 9 and 10 at intervals over an extended period of time. The results are shown in FIG. 3. The viscosity of Examples 8, 9 and 10 was measured after 197 days. The results are shown in FIG. 4. Examples 9 and 10 exhibited lower viscosity than comparative Example 8.

Colour Analysis

| | Example 8 (Comparative) | Example 9 | Example 10 |
|---|---|---|---|
| L | 77.26 | 77.18 | 77.17 |
| a | −9.42 | −9.40 | −9.32 |
| b | 48.61 | 48.52 | 46.1 |

Examples 8, 9 and 10 demonstrated comparable colour strength.

Flocculation Assessment

Example 9 was added at 2% to chalk paint, which was applied to a test card. Virtually no flocculation was observed when carrying out the rub-out test.

Formulation:

| | Example 11 (Comparative) | Example 12 | Example 13 |
|---|---|---|---|
| Pigment Yellow 110 | 40 | 40 | 40 |
| Lansperse DS200W | 8.75 | — | — |
| Example 3 | — | 8.75 | — |
| Example 4 | — | — | 7 |
| Defoamer | 0.06 | 0.06 | 0.06 |
| Biocide | 0.07 | 0.07 | 0.07 |
| Water | 51.12 | 51.12 | 52.87 |

Viscosity Analysis

Figure 5:
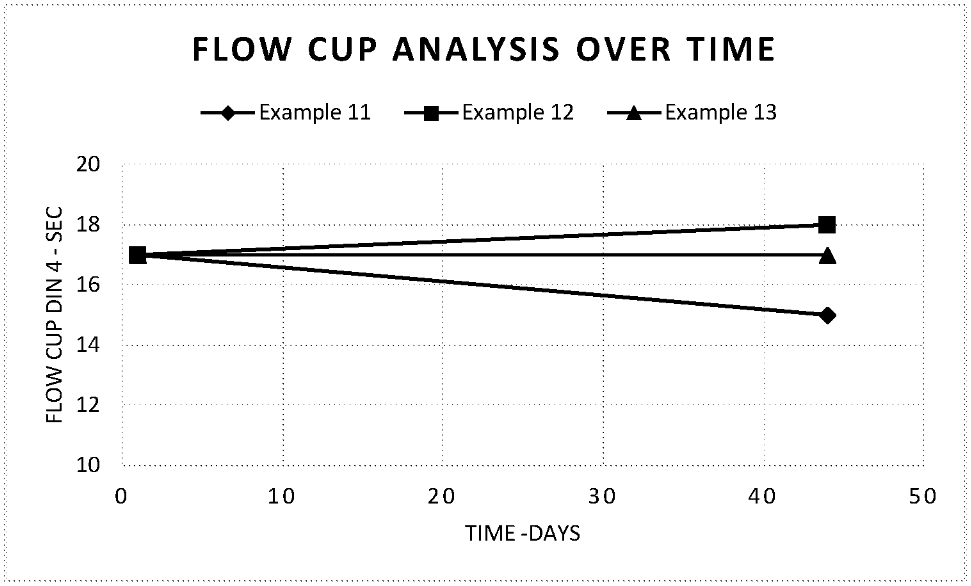
FIG. 5 shows the flow cup analysis of Examples 11, 12 and 13 over time.
Figure 6:
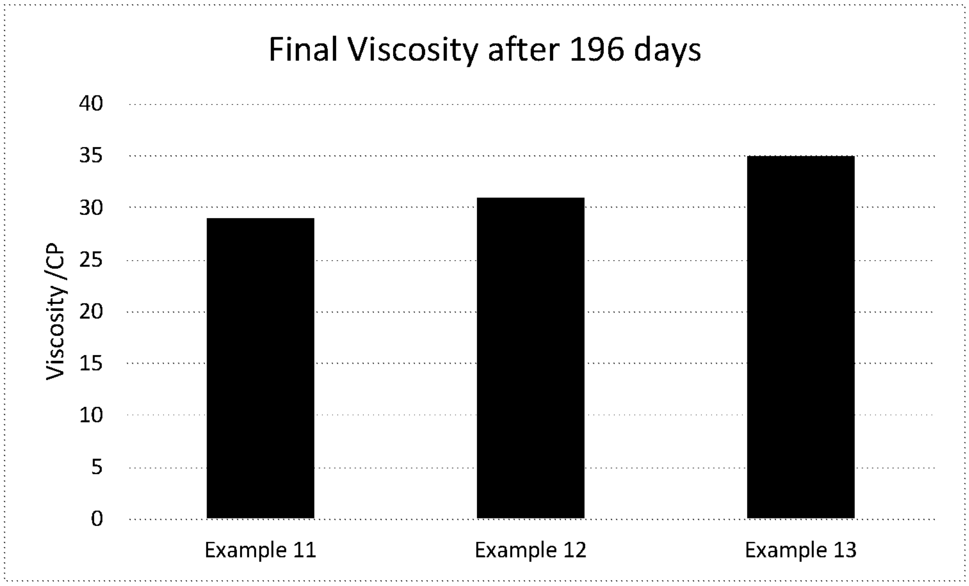
FIG. 6 shows the viscosity of Examples 11, 12 and 13 after 196 days.

Flow cup analysis was carried out on Examples 11, 12 and 13 at intervals over an extended period of time. The results are shown in FIG. 5. The viscosity of Examples 11, 12 and 13 was measured after 197 days. The results are shown in FIG. 6. The dispersions exhibited comparable viscosities.

Colour Analysis

| | Example 11 (Comparative) | Example 12 |
|---|---|---|
| L | 75.10 | 73.60 |
| a | 2.02 | 2.34 |
| b | 42.23 | 40.87 |

Examples 11 and 12 demonstrated comparable colour strength.

Particle Size Analysis

Figure 7A:
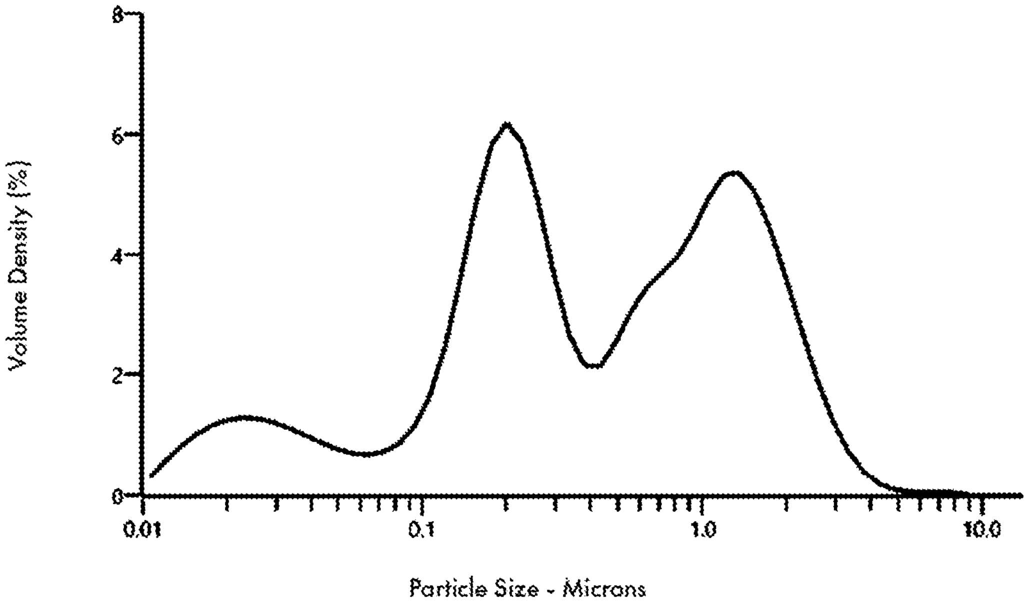
FIGS. 7*a* and 7*b* show the particle size analysis of Examples 11 and 12, respectively.
Figure 7B:
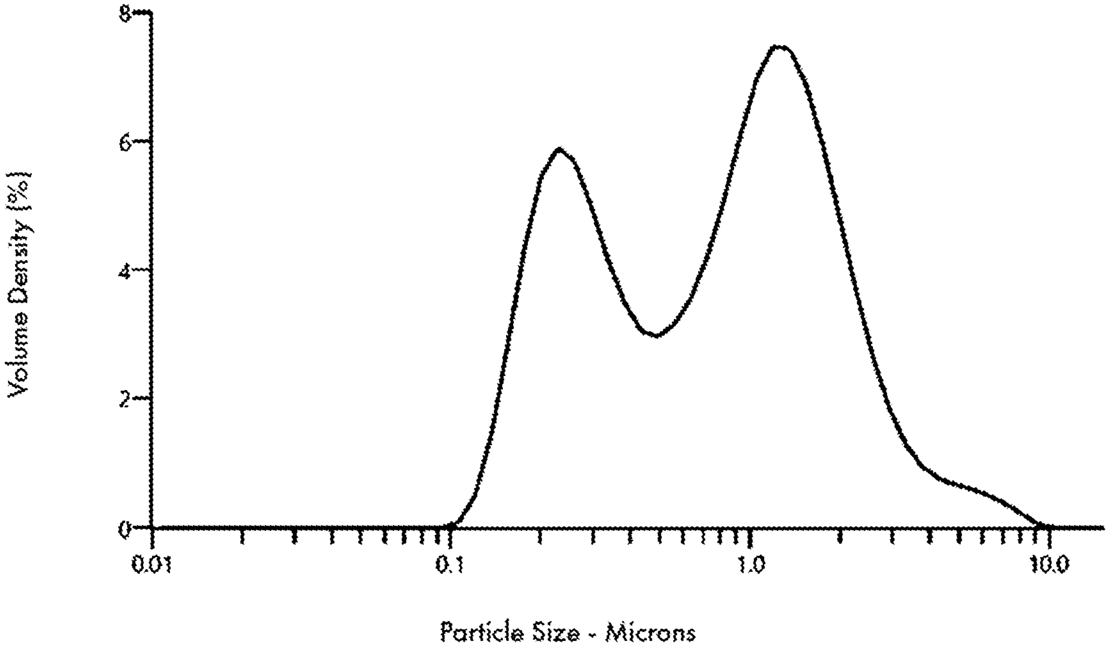

The particle size distributions of Examples 11 and 12 are shown in FIG. 7. The dispersions had comparable particle size distributions.

Formulation:

| | Example 14 (Comparative) | Example 15 |
|---|---|---|
| Black 7 | 41 | 41 |
| Lansperse DS200W | 11.25 | — |
| Example 3 | — | 11.25 |
| Monoethanolamine | 0.8 | 0.8 |
| Defoamer | 0.06 | 0.06 |
| Biocide | 0.07 | 0.07 |
| Water | 46.82 | 46.82 |

Viscosity Analysis

Figure 8:
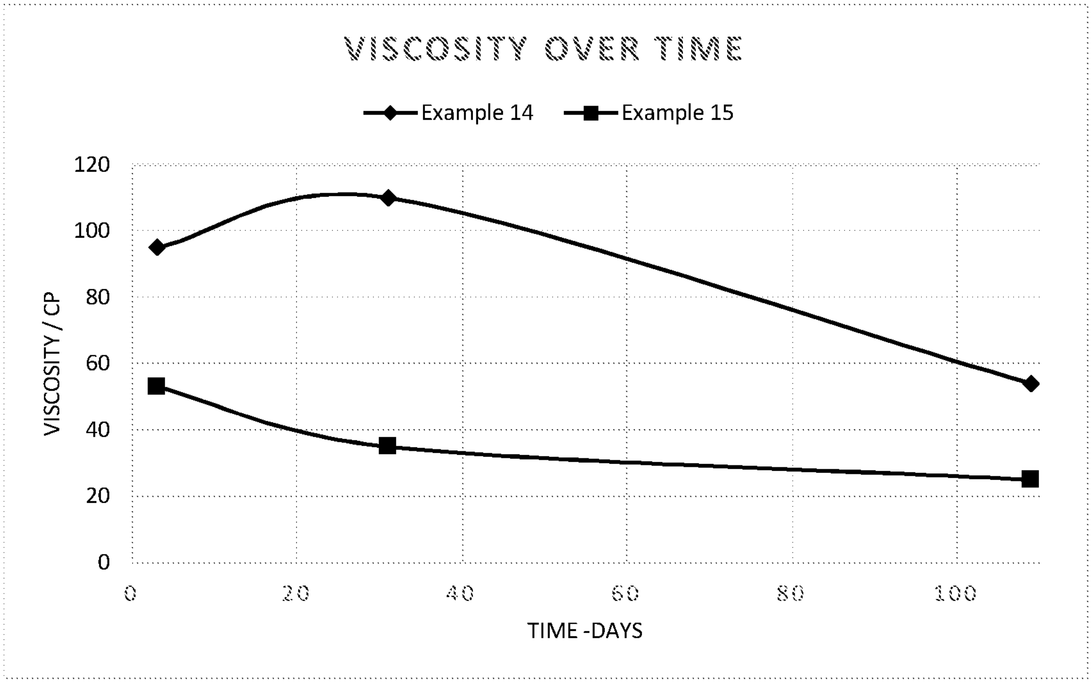
FIG. 8 shows the viscosity of Examples 14 and 15 over time.

The viscosities of Examples 14 and 15 were measured at intervals over an extended period of time. The results are shown in FIG. 8. Example 15 exhibited lower viscosity than comparative Example 14.

Colour Analysis

| | Example 14 (Comparative) | Example 15 |
|---|---|---|
| L | 34.59 | 34.62 |
| a | 1.17 | 1.22 |
| b | 0.62 | 0.73 |

Examples 14 and 15 demonstrated comparable colour strength.

Particle Size Analysis

Figure 9A:
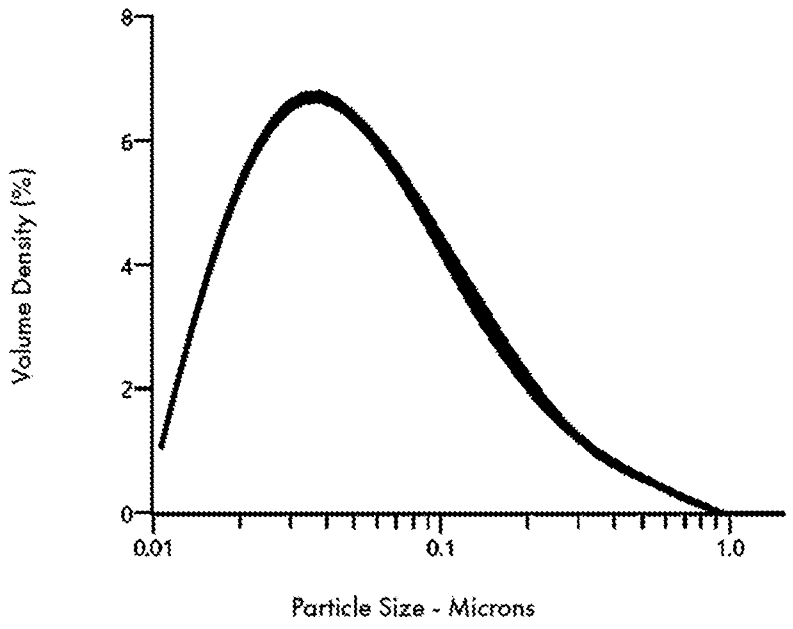
FIGS. 9*a* and 9*b* show the particle size analysis of Examples 14 and 15, respectively.
Figure 9B:
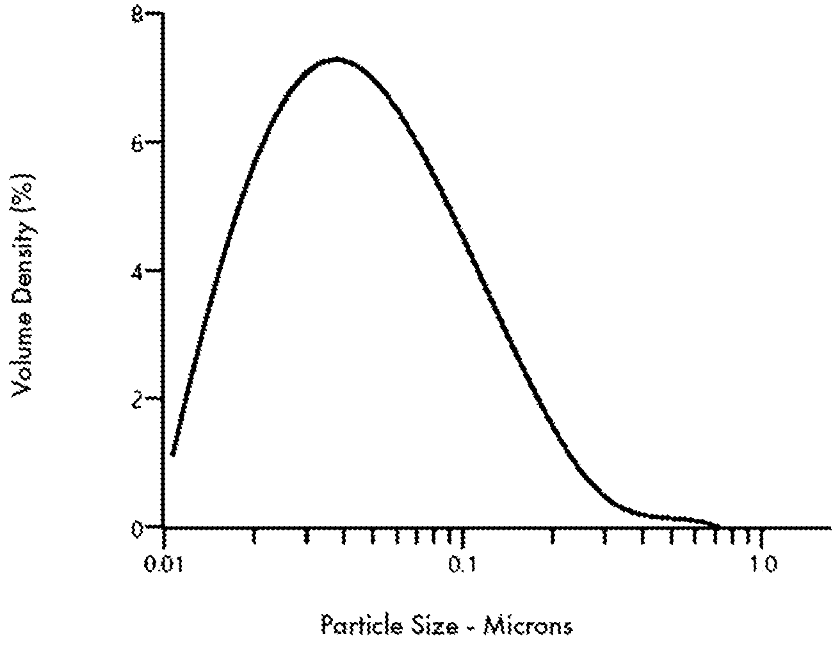

The particle size distributions of Examples 14 and 15 are shown in FIG. 9. The dispersions had comparable particle size distributions.

Formulation:

| | Example 16 (Comparative) | Example 17 |
|---|---|---|
| Pigment Blue 15.3 | 50 | 50 |
| Lansperse DS200W | 10 | — |
| Example 4 | — | 8 |
| Defoamer | 0.06 | 0.06 |
| Biocide | 0.07 | 0.07 |
| Water | 39.87 | 41.87 |

Viscosity Analysis

Figure 10:
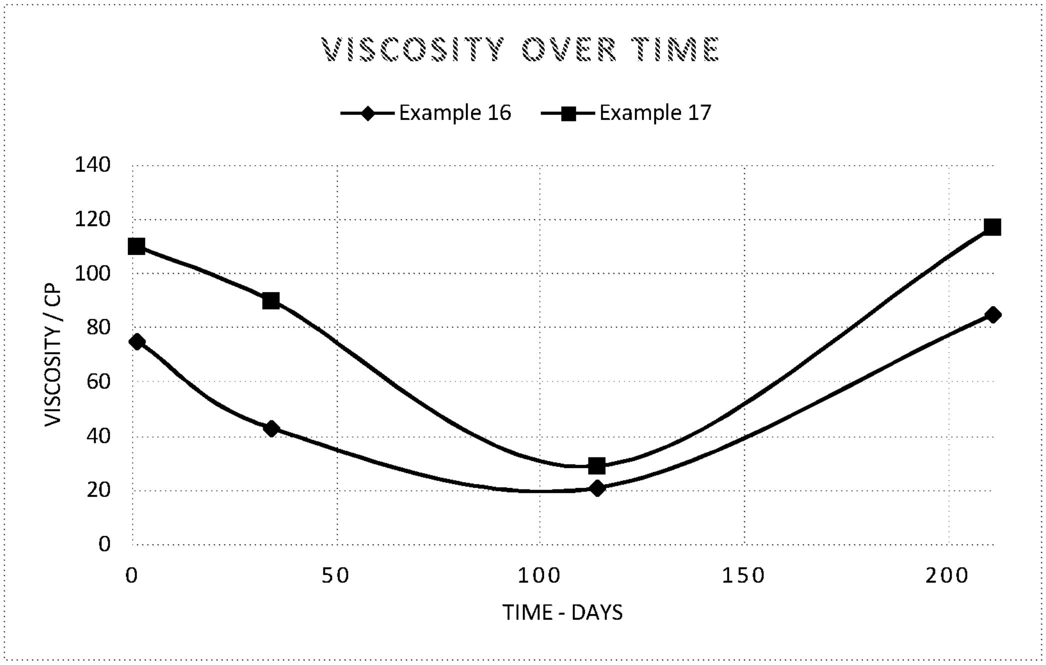
FIG. 10 shows the viscosity of Examples 16 and 17 over time.

The viscosities of Examples 16 and 17 were measured at intervals over an extended period of time. The results are shown in FIG. 10. The viscosity of Examples 16 and 17 was comparable.

Colour Analysis

| | Example 16 (Comparative) | Example 17 |
|---|---|---|
| L | 47.87 | 48.42 |
| a | −7.44 | −7.56 |
| b | −37.33 | −38.38 |

Examples 16 and 17 demonstrated comparable colour strength.

Particle Size Analysis

Figure 11A:
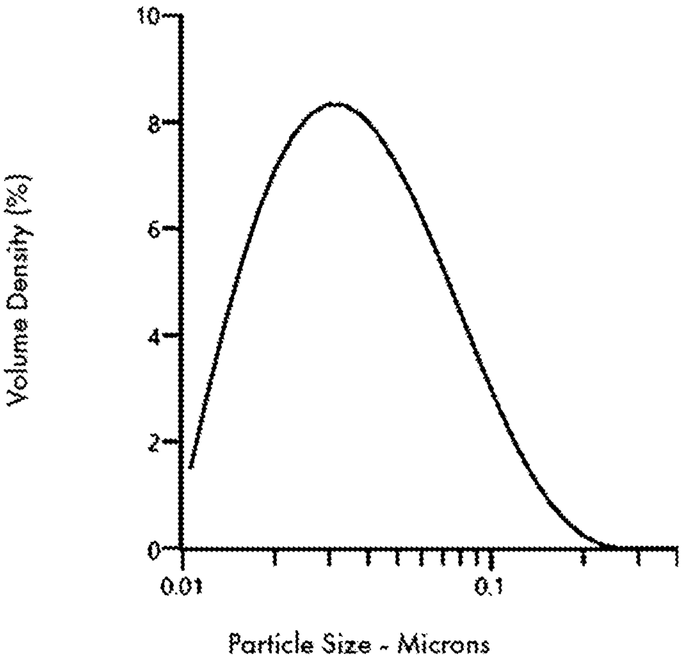
FIGS. 11*a* and 11*b* show the particle size analysis of Examples 16 and 17, respectively.
Figure 11B:
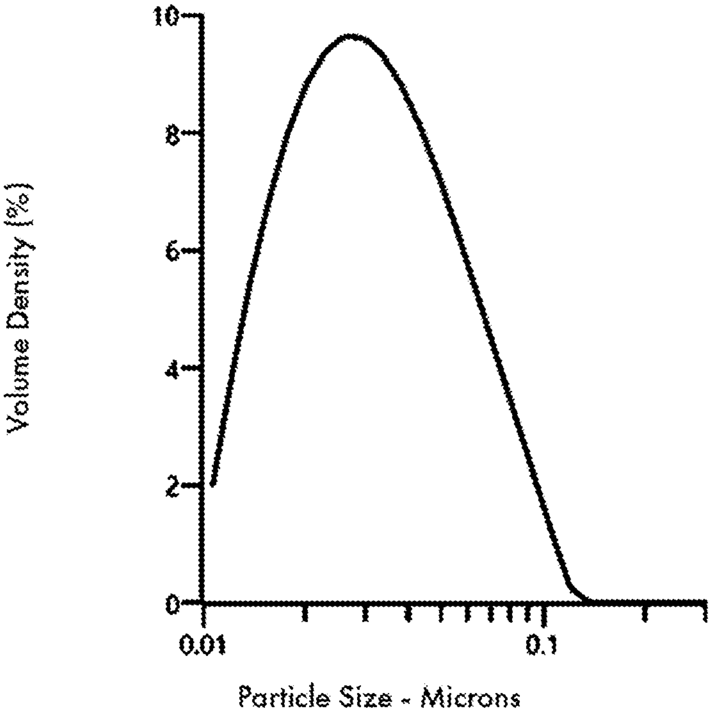

The particle size distributions of Examples 16 and 17 are shown in FIG. 11. The dispersions had comparable particle size distributions.

Formulation:

| | Example 18 (Comparative) | Example 19 |
|---|---|---|
| Pigment Yellow 74 | 20 | 20 |
| Solsperse 39000[1] | 2.4 | — |
| Example 4 | — | 2.88 |
| Solsperse 22000[2] | 0.48 | — |
| DPGDA[3] | 77.12 | 77.12 |

[1]Dispersant
2Synergist
[3]Dipropylene glycol diacrylate

Viscosity Analysis

Figure 12:
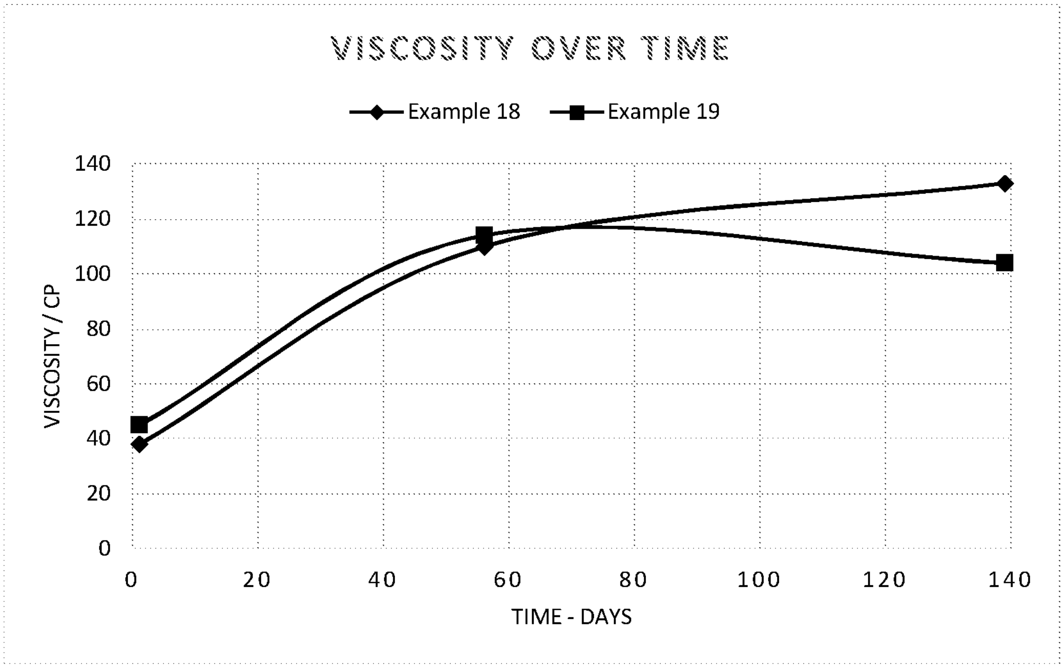
FIG. 12 shows the viscosity of Examples 18 and 19 over time.

The viscosities of Examples 18 and 19 were measured at intervals over an extended period of time. The results are shown in FIG. 12. Example 19 demonstrated comparable viscosity to Example despite not including a synergist (e.g. Solsperse 22000).

Colour Analysis

| | Example 18 (Comparative) | Example 19 |
|---|---|---|
| L | 87.35 | 87.37 |
| a | 8.74 | 8.63 |
| b | 61.65 | 60.43 |

Examples 18 and 19 demonstrated comparable colour strength.

The example embodiments described above may provide dispersions with excellent long-term stability.

Conventional dispersions containing solid particulate components such as pigments may encounter problems regarding the stability of the dispersions over time. Furthermore, conventional dispersing agents cannot be produced from renewable sources. These problems may be addressed by example embodiments as described herein.

In summary, a dispersion comprising a solid particulate component, a dispersing agent and one or more solvents is disclosed. The dispersing agent comprises a reaction product of:

(a) an epoxidised carboxylic acid ester;

(b) a compound including at least one reactive alcohol and/or amino functional group; and (c) a derivatising agent.

Such a dispersion shows excellent long-term stability. A method of producing such a dispersion having long-term stability, and a use of the dispersing agent to provide a dispersion having long-term stability are also described. The performance of these dispersing agents and the dispersions containing them is comparable to or better than the performance of known dispersing agents. This advantageous performance is achieved in addition to the dispersing agents of the present invention having an improved environmental and safety profile compared to known dispersing agents. Therefore these dispersing agents allow the production of a concentrate liquid, a paint, coating, polymer or ink with an improved environmental profile without having to sacrifice dispersing performance and therefore the quality of these compositions.

Although a few preferred embodiments have been shown and described, it will be appreciated by those skilled in the art that various changes and modifications might be made without departing from the scope of the invention, as defined in the appended claims.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding addition of other components.

Whenever appropriate, depending upon the context, the use of the term "comprises" or "comprising" may also be taken to encompass or include the meaning "consists essentially of" or "consisting essentially of", and may also be taken to include the meaning "consists of" or "consisting of".

For the avoidance of doubt, wherein amounts of components in a composition are described in wt % based on the total weight of solids, this means the weight percentage of the specified component in relation to the whole composition referred to, except for solvents. For example, "wherein the solid particulate component is present in the dispersion in an amount of from 50 to 95 wt % based on the total weight of the solids in the dispersion" means that 50 to 95 wt % of the solid (i.e. non-volatile) components in the dispersion is provided by the solid particulate component.

The optional features set out herein may be used either individually or in combination with each other where appropriate and particularly in the combinations as set out in the accompanying claims. The optional features for each aspect or exemplary embodiment of the invention as set out herein are also to be read as applicable to any other aspect or exemplary embodiments of the invention, where appropriate. In other words, the skilled person reading this specification should consider the optional features for each exemplary embodiment of the invention as interchangeable and combinable between different exemplary embodiments.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A liquid dispersion comprising:

a solid particulate component;

a dispersing agent; and one or more solvents;

wherein the dispersing agent comprises a reaction product of:

(a) an epoxidized carboxylic acid ester;

(b) an alkoxylated compound including at least one reactive alcohol and/or amino functional group; and (c) a derivatizing agent selected from a hydrolysis agent, a compound including at least one reactive alcohol or amino functional group, or a sulfonating agent.

2. A method of producing a dispersion having long-term stability, the method comprising the steps of:

(a) mixing together a dispersing agent and one or more solvents; and (b) adding a solid particulate component to form a dispersion;

wherein the dispersing agent comprises a reaction product of:

(i) an epoxidized carboxylic acid ester;

(ii) an alkoxylated compound including at least one reactive alcohol and/or amino functional group; and (iii) a derivatizing agent selected from a hydrolysis agent, a compound including at least one reactive alcohol or amino functional group, or a sulfonating agent.

3. A method or use according to claim 2, wherein the dispersing agent prevents flocculation of the solid particulate component.

4. The dispersion according to claim 1 wherein the dispersing agent comprises a reaction product of (c) with a reaction product of (a) an and (b).

5. The dispersion according to claim 1 wherein said epoxidized carboxylic acid ester (a) comprises an ester of formula $RCOOR^1$ in which R is a hydrocarbyl group including an epoxy functional group and $R^1$ is a hydrocarbyl group.

6. The dispersion according to claim 1 wherein said epoxidized carboxylic acid ester (a) comprises an epoxidized soybean oil fatty acid ester.

7. The dispersion according to claim 1 wherein said compound (b) comprises a compound of formula (I):

$$R^5-\left[X-R^4\right]_n-XH \qquad (I)$$

wherein n is 0 or a positive integer; each X is independently O or NH; each group $R^4$ is independently an optionally substituted alkylene, alkenylene or arylene group; and $R^5$ is hydrogen or an optionally substituted alkyl, alkenyl, aryl, alkaryl or aralkyl group provided that n is not 0 when $R^5$ is hydrogen.

8. The dispersion according to claim 1 wherein said derivatizing agent (c) comprises a compound including at least one reactive alcohol or amino functional group and one tertiary amino group.

9. The dispersion according to claim 1 wherein said derivatizing agent (c) comprises a compound of formula (III):

$$R^{10}-\left[X^3-R^9\right]_p-X^4H \qquad (III)$$

wherein p is 0 or a positive integer, each $X^3$ is independently O or $NR^{11}$, $X^4$ is O or $NR^{12}$, each $R^9$ is independently an optionally substituted alkylene, alkenylene or arylene group, and each of $R^{10}$, $R^{11}$ and $R^{12}$ is independently hydrogen or an optionally substituted alkyl, alkenyl, aryl, alkaryl or aralkyl group.

10. The dispersion according to claim 9 wherein p is at least 10, each $X^3$ is O, $X^4$ is O, each $R^9$ is an unsubstituted alkylene or alkenylene group, and $R^{10}$ is hydrogen or an unsubstituted alkyl or alkenyl group.

11. The dispersion according to claim 9 wherein p is 1, $X^3$ is $NR^{11}$, $X^4$ is NH, $R^9$ is an unsubstituted $C_1$ to $C_8$ alkylene group, and $R^{10}$ and $R^{11}$ are independently an unsubstituted $C_1$ to $C_4$ alkyl group.

12. The dispersion according to claim 9, wherein the solid particulate component comprises a pigment.

13. The dispersion according to claim 12, wherein the solid particulate component comprises one of an organic pigment and an inorganic pigment.

14. The dispersion according to claim 9 wherein the solid particulate component is present in an amount of from 50 to 95 wt % based on the total weight of solids in the dispersion.

15. The dispersion according to claim 9 wherein the dispersing agent is present in an amount of from 5 to 30 wt % based on the total weight of solids in the dispersion.

16. The dispersion according to claim 9 wherein the dispersion comprises one or more further components selected from resins, pH modifiers, humectants, binders, solvents, antifoaming agents, surfactants, biocides, rheology modifiers, extenders, silicones, UV stabilisers, catalysts, fillers, driers, and anti-settling agents.

17. The dispersion according to claim 9 wherein the one or more solvents comprise water.

18. A paint, ink, polymer or coating composition comprising the dispersion according to claim 1 and one or more further components.

* * * * *